(12) United States Patent
Hyon et al.

(10) Patent No.: US 12,474,068 B2
(45) Date of Patent: Nov. 18, 2025

(54) AIR-CONDITIONING SYSTEM

(71) Applicant: LG ELECTRONICS INC., Seoul (KR)

(72) Inventors: Chinsoo Hyon, Seoul (KR); Sehwan Bae, Seoul (KR); Heejae Kwon, Seoul (KR); Jeeyoung Yeon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 663 days.

(21) Appl. No.: 17/742,564

(22) Filed: May 12, 2022

(65) Prior Publication Data

US 2022/0373196 A1 Nov. 24, 2022

(30) Foreign Application Priority Data

May 24, 2021 (KR) .................. 10-2021-0065983
May 24, 2021 (KR) .................. 10-2021-0065986

(51) Int. Cl.
*F24F 1/0014* (2019.01)
*B01D 46/00* (2022.01)
(Continued)

(52) U.S. Cl.
CPC ........ *F24F 1/0014* (2013.01); *B01D 46/0004* (2013.01); *B01D 46/0005* (2013.01);
(Continued)

(58) Field of Classification Search
CPC ............ B01D 46/0005; B01D 46/0043; B01D 46/0049; B01D 46/44; B01D 46/58;
(Continued)

(56) References Cited

U.S. PATENT DOCUMENTS 3,618,659 A * 11/1971 Rawal ................. F24F 3/044
165/104.34
4,203,566 A 5/1980 Lord
(Continued)

FOREIGN PATENT DOCUMENTS

CN 1707169 12/2005
CN 1971153 5/2007
(Continued)

OTHER PUBLICATIONS

Japanese Office Action issued in Application No. 2022-082832 dated May 30, 2023.
(Continued)

*Primary Examiner* — Duane Smith
(74) *Attorney, Agent, or Firm* — KED & ASSOCIATES

(57) ABSTRACT

An air-conditioning system is provided that may include a first air-processing apparatus, which includes a first outlet formed to be open toward a floor and a first inlet formed to be open in a direction inclined relative to a direction in which the first outlet is open and is configured to deliver heat-exchanged air to the first outlet, and a second air-processing apparatus, which includes a second outlet formed to be open in a direction parallel to the first outlet and a second inlet formed to be open in a direction parallel to the first inlet and is configured to deliver purified air to the second outlet. The first outlet and the second outlet extend in a lateral direction, and the first air-processing apparatus and the second air-processing apparatus are arranged in the lateral direction.

16 Claims, 37 Drawing Sheets

(51) Int. Cl.
  *B01D 46/44* (2006.01)
  *B01D 46/58* (2022.01)
  *B01D 46/681* (2022.01)
  *F24F 1/0073* (2019.01)
  *F24F 13/14* (2006.01)
  *F24F 13/22* (2006.01)

(52) U.S. Cl.
  CPC ..... *B01D 46/0043* (2013.01); *B01D 46/0049* (2013.01); *B01D 46/44* (2013.01); *B01D 46/58* (2022.01); *B01D 46/681* (2022.01); *F24F 1/0073* (2019.02); *F24F 13/1426* (2013.01); *F24F 13/222* (2013.01); *B01D 2273/30* (2013.01); *B01D 2279/50* (2013.01); *F24F 2221/22* (2013.01)

(58) Field of Classification Search
  CPC ............ B01D 2273/30; B01D 2279/50; B01D 46/681; B01D 46/68; F24F 1/0014; F24F 1/0047; F24F 1/0071; F24F 1/0073; F24F 1/0025; F24F 1/0063; F24F 13/1426; F24F 13/222; F24F 13/20; F24F 8/108; F24F 2221/22; F24F 8/035; F24F 3/16; F24F 8/10; F24F 8/80; F24F 8/90; F24F 13/28; F24F 13/085
  USPC ... 55/385.1, 385.2, 284, 288, 289, 282, 295, 55/296, 297, 299, 300, 304; 454/230, 454/334; 95/278; 62/303, 331, 284
  See application file for complete search history.

(56) References Cited

U.S. PATENT DOCUMENTS

| | | | |
|---|---|---|---|
| 4,610,196 A | 9/1986 | Kern | |
| 5,564,626 A * | 10/1996 | Kettler | F24F 8/10 55/471 |
| 5,595,068 A | 1/1997 | Amr | |
| 5,674,124 A | 10/1997 | Davis | |
| 5,697,841 A | 12/1997 | Di Giovine | |
| 6,729,154 B2 * | 5/2004 | Takashima | B01D 46/103 55/284 |
| 6,974,377 B2 | 12/2005 | Gehring | |
| 7,544,223 B2 * | 6/2009 | Oda | F24F 1/0073 55/296 |
| 7,862,636 B2 * | 1/2011 | Mun | F24F 1/0047 55/296 |
| 8,007,553 B2 * | 8/2011 | Cho | F24F 8/90 55/296 |
| 8,038,517 B2 * | 10/2011 | Shibuya | F24F 13/28 454/251 |
| 8,118,899 B2 * | 2/2012 | Zhang | B01D 46/681 55/296 |
| 8,241,376 B2 * | 8/2012 | Zhang | F24F 8/90 55/296 |
| 8,252,078 B2 * | 8/2012 | Mun | F24F 8/90 55/296 |
| 8,282,695 B2 * | 10/2012 | Shibuya | B01D 46/681 55/296 |
| 8,343,244 B2 * | 1/2013 | Sakashita | B08B 9/035 55/296 |
| 8,631,664 B2 * | 1/2014 | Shibuya | F24F 1/0057 62/317 |
| 8,813,518 B2 * | 8/2014 | Sugiyama | B01D 46/681 55/282 |
| 10,989,429 B2 * | 4/2021 | Okamoto | F24F 11/64 |
| 12,134,058 B2 * | 11/2024 | Hyon | B01D 46/04 |
| 2002/0189274 A1 * | 12/2002 | Lee | F24F 1/0083 62/262 |
| 2004/0000160 A1 * | 1/2004 | Takashima | B01D 46/681 62/262 |
| 2006/0032260 A1 | 2/2006 | Kang | |
| 2006/0070358 A1 * | 4/2006 | Oda | F24F 1/0073 55/471 |
| 2006/0096459 A1 * | 5/2006 | Iwano | F24F 1/0073 55/296 |
| 2007/0060036 A1 * | 3/2007 | Shibuya | F24F 1/0073 454/187 |
| 2009/0183471 A1 * | 7/2009 | Shibuya | F24F 1/0057 55/282.2 |
| 2010/0040457 A1 * | 2/2010 | Tsen | F04D 29/526 415/121.3 |
| 2010/0107575 A1 * | 5/2010 | Zhang | B01D 46/681 55/289 |
| 2010/0116463 A1 * | 5/2010 | Zhang | F24F 8/108 165/95 |
| 2010/0236268 A1 * | 9/2010 | Sugiyama | F24F 1/0057 62/303 |
| 2011/0143899 A1 | 6/2011 | Wirth et al. | |
| 2012/0137876 A1 * | 6/2012 | Miller | B01D 46/0043 55/471 |
| 2012/0151885 A1 | 6/2012 | Nishihata et al. | |
| 2014/0026525 A1 * | 1/2014 | Miller | B01D 46/64 55/385.2 |
| 2014/0131026 A1 | 5/2014 | Hurd | |
| 2015/0202559 A1 * | 7/2015 | Oh | F24F 13/28 55/289 |
| 2015/0276257 A1 * | 10/2015 | Iwano | F24F 13/28 96/60 |
| 2016/0227916 A1 * | 8/2016 | Kang | B08B 1/54 |
| 2017/0157547 A1 * | 6/2017 | Payne | F24F 13/28 |
| 2017/0191677 A1 * | 7/2017 | Jeong | F24F 1/0047 |
| 2018/0008926 A1 * | 1/2018 | Oishi | F24F 13/20 |
| 2018/0017282 A1 * | 1/2018 | Liu | F24F 1/0057 |
| 2018/0017284 A1 * | 1/2018 | Oishi | B01D 46/4227 |
| 2018/0051895 A1 * | 2/2018 | Morioka | B03C 3/04 |
| 2018/0051905 A1 * | 2/2018 | Morioka | B03C 3/47 |
| 2019/0041083 A1 | 2/2019 | Kojima et al. | |
| 2019/0049137 A1 | 2/2019 | Kojima et al. | |
| 2019/0056120 A1 | 2/2019 | Cho | |
| 2019/0199960 A1 | 6/2019 | Miyazaki | |
| 2019/0219277 A1 | 7/2019 | Kim | |
| 2019/0275455 A1 | 9/2019 | Choi et al. | |
| 2021/0205742 A1 * | 7/2021 | Chamarthi | B01D 46/0086 |
| 2021/0356168 A1 * | 11/2021 | Lu | B01D 46/44 |
| 2022/0099334 A1 * | 3/2022 | Lu | F24F 13/20 |
| 2022/0370942 A1 * | 11/2022 | Hyon | B01D 46/04 |
| 2022/0373196 A1 * | 11/2022 | Hyon | F24F 13/1426 |
| 2022/0373197 A1 * | 11/2022 | Hyon | F24F 1/0073 |
| 2022/0373220 A1 * | 11/2022 | Hyon | F24F 13/1413 |
| 2023/0067989 A1 * | 3/2023 | Yang | A61L 9/18 |

FOREIGN PATENT DOCUMENTS

| | | |
|---|---|---|
| CN | 101048621 | 10/2007 |
| CN | 101370676 | 2/2009 |
| CN | 102460031 | 5/2012 |
| CN | 202747532 | 2/2013 |
| CN | 105276718 | 1/2016 |
| CN | 206682042 | 11/2017 |
| CN | 108180547 | 6/2018 |
| CN | 108387133 | 8/2018 |
| CN | 109790998 | 5/2019 |
| CN | 110332611 | 10/2019 |
| CN | 209763287 | 12/2019 |
| CN | 210050921 | 2/2020 |
| CN | 107250683 | 4/2020 |
| CN | 210463497 | 5/2020 |
| CN | 111637508 | 9/2020 |
| CN | 211977205 | 11/2020 |
| DE | 20 2007 001 644 | 7/2007 |
| DE | 10 2018 219 702 | 5/2020 |
| EP | 1 271 065 | 1/2003 |
| EP | 2 058 602 | 5/2009 |
| EP | 2 381 182 | 10/2011 |
| EP | 2 426 429 | 3/2012 |
| EP | 2725306 | 4/2014 |
| EP | 2 881 273 | 6/2015 |
| EP | 3 406 980 | 11/2018 |
| EP | 3 690 328 | 8/2020 |

(56) References Cited

FOREIGN PATENT DOCUMENTS

| | | |
|---|---|---|
| JP | H06-106967 | 4/1994 |
| JP | H06-147531 | 5/1994 |
| JP | H07-225046 | 8/1995 |
| JP | 08-005091 | 1/1996 |
| JP | H08-226668 | 9/1996 |
| JP | 08-270978 | 10/1996 |
| JP | 2001-263788 | 9/2001 |
| JP | 2003-148763 | 5/2003 |
| JP | 2004-101094 | 4/2004 |
| JP | 2005-172261 | 6/2005 |
| JP | 2005-214429 | 8/2005 |
| JP | 2006-145192 | 6/2006 |
| JP | 2006-162217 | 6/2006 |
| JP | 2007-024345 | 2/2007 |
| JP | 2008-039293 | 2/2008 |
| JP | 2008-069985 | 3/2008 |
| JP | 2008-122055 | 5/2008 |
| JP | 2008-133973 | 6/2008 |
| JP | 2008-164190 | 7/2008 |
| JP | 2008-224133 | 9/2008 |
| JP | 2008-241054 | 10/2008 |
| JP | 2008-267795 | 11/2008 |
| JP | 2009-002602 | 1/2009 |
| JP | 2009-186077 | 8/2009 |
| JP | 2012-013392 | 1/2012 |
| JP | 2014-077599 | 5/2014 |
| JP | 2014-129954 | 7/2014 |
| JP | 2017-524119 | 8/2017 |
| JP | 2019-170863 | 10/2019 |
| KR | 10-1999-0068938 | 9/1999 |
| KR | 20-0164654 | 2/2000 |
| KR | 20-0184583 | 6/2000 |
| KR | 10-2003-0053864 | 7/2003 |
| KR | 10-2004-0056151 | 6/2004 |
| KR | 20-0380530 | 3/2005 |
| KR | 10-0487474 | 5/2005 |
| KR | 10-2005-0122523 | 12/2005 |
| KR | 10-2006-0119068 | 11/2006 |
| KR | 10-0787501 | 12/2007 |
| KR | 10-2008-0026287 | 3/2008 |
| KR | 10-2008-0058732 | 6/2008 |
| KR | 10-2008-0078199 | 8/2008 |
| KR | 10-2009-0017290 | 2/2009 |
| KR | 10-2009-0052609 | 5/2009 |
| KR | 10-2009-0081607 | 7/2009 |
| KR | 10-0921921 | 10/2009 |
| KR | 10-2010-0036919 | 4/2010 |
| KR | 10-2012-0034446 | 4/2012 |
| KR | 10-2013-0108749 | 10/2013 |
| KR | 10-2014-0056465 | 5/2014 |
| KR | 10-2015-0018201 | 2/2015 |
| KR | 10-2015-0086092 | 7/2015 |
| KR | 10-2017-0080102 | 7/2017 |
| KR | 10-2018-0066546 | 6/2018 |
| KR | 10-2018-0126217 | 11/2018 |
| KR | 10-2019-0106608 | 9/2019 |
| KR | 10-2019-0106684 | 9/2019 |
| KR | 10-2019-0107784 | 9/2019 |
| KR | 10-2111216 | 5/2020 |
| KR | 10-2020-0106401 | 9/2020 |
| KR | 10-2020-0144534 | 12/2020 |
| KR | 10-2021-0005979 | 1/2021 |
| KR | 10-2021-0005980 | 1/2021 |
| KR | 10-2021-0007010 | 1/2021 |
| RU | 2 347 149 | 12/2007 |
| WO | WO 2004/070283 | 8/2004 |
| WO | WO 2004/079271 | 9/2004 |
| WO | WO 2006/043430 | 4/2006 |
| WO | WO 2010/047443 | 4/2010 |
| WO | WO 2011/043123 | 4/2011 |
| WO | WO 2016/121071 | 8/2016 |
| WO | WO 2019/167313 | 9/2019 |
| WO | WO 2021/053985 | 3/2021 |

OTHER PUBLICATIONS

Korean Notice of Allowance issued in Application No. 10-2021-0174215 dated Jul. 27, 2023.
Japanese Office Action dated Jul. 4, 2023, issued in Application No. 2022-081386.
U.S. Office Action issued in U.S. Appl. No. 17/742,706 dated Jan. 9, 2024.
U.S. Office Action dated Oct. 31, 2024 issued in U.S. Appl. No. 17/742,758.
India Office Action dated Nov. 29, 2022 issued in IN Application No. 202214012882.
Japanese Office Action issued in Application No. 2022-083486 dated Jun. 20, 2023.
Japanese Office Action issued in Application No. 2022-082791 dated Jun. 6, 2023.
Korean Notice of Allowance issued in Application No. 10-2021-0174218 dated Jul. 27, 2023.
European Search Report dated Oct. 13, 2022 issued in EP Application No. 22173411.4.
Korean Office Action issued in Application No. 10-2021-0065983 dated Jul. 6, 2022.
Korean Office Action dated Apr. 14, 2023 issued in Application No. 10-2021-0065985.
Chinese Office Action dated Jun. 3, 2024 issued in Application No. 202210557584.7.
Korean Office Action issued in Application No. 10-2021-0174217 dated Mar. 10, 2023.
Korean Office Action issued in Application No. 10-2021-0174215 dated Mar. 10, 2023.
Korean Office Action issued in Application No. 10-2021-0174218 dated Mar. 20, 2023.
India Office Action dated Dec. 9, 2022 issued in IN Application No. 202214012610.
European Search Report dated Oct. 19, 2022 issued in EP Application No. 22173409.8.
European Search Report dated Oct. 28, 2022 issued in EP Application No. 22173423.9.
European Search Report dated Nov. 7, 2022 issued in EP Application No. 22173506.1.
India Office Action dated Nov. 29, 2022 issued in IN Application No. 202214012895.
India Office Action dated Dec. 1, 2022 issued in IN Application No. 202214012883.
India Office Action dated Dec. 6, 2022 issued in IN Application No. 202214012894.
Korean Office Action dated Jan. 9, 2023 issued in KR Application No. 10-2021-0065987.
India Office Action dated Jan. 3, 2023 issued in IN Application No. 202214012884.
Korean Office Action dated Jan. 9, 2023 issued in KR Application No. 10-2021-0065989.
European Search Report dated Oct. 14, 2022 issued in EP Application No. 22173504.6.
Korean Office Action dated Oct. 18, 2022 issued in KR Application No. 10-2021-0065984.
Korean Office Action dated Oct. 18, 2022 issued in KR Application No. 10-2021-0065986.
European Search Report dated Oct. 21, 2022 issued in EP Application No. 22173436.1.
U.S. Appl. No. 17/742,706, filed May 12, 2022.
U.S. Appl. No. 17/742,758, filed May 12, 2022.
U.S. Appl. No. 17/742,564, filed May 12, 2022.
U.S. Appl. No. 17/742,650, filed May 12, 2022.
U.S. Appl. No. 17/743,088, filed May 12, 2022.
U.S. Appl. No. 17/742,785, filed May 12, 2022.
U.S. Notice of Allowance issued in U.S. Appl. No. 17/743,088 dated Feb. 5, 2025.
U.S. Office Action issued in U.S. Appl. No. 17/742,785 dated Jan. 31, 2025.

(56) References Cited

OTHER PUBLICATIONS

Chinese Office Action issued in Application No. 202210557596.X dated Mar. 25, 2025.

\* cited by examiner

AIR-CONDITIONING SYSTEM

CROSS-REFERENCE TO RELATED APPLICATION(S)

This application claims priority under 35 U.S.C. § 119 to Korean Application Nos. 10-2021-0065983 and 10-2021-0065986, filed in Korea on May 24, 2021, whose entire disclosures are hereby incorporated by reference.

BACKGROUND

1. Field

An air-conditioning system, and more particularly, an air-conditioning system including a plurality of air-processing apparatuses is disclosed herein.

2. Background

An air-conditioning system may include an air conditioner that adjusts an indoor temperature and an air purifier that removes fine dust from indoor air. In the case of an air conditioner, a stand-type indoor unit, a wall-mounted indoor unit, or a ceiling-mounted indoor unit may be mounted in an indoor space in order to adjust the temperature of the indoor space. An air purifier is generally configured to be movable, and is disposed on a floor of an indoor space in order to purify contaminated air in the indoor space.

Because an air conditioner and an air purifier are physically separated from each other and are located at different positions, a region in which the air conditioner discharges heat-exchanged air and a region in which the air purifier discharges purified air may differ from each other. In order to address this problem, a filter may be disposed in an inlet region of the air conditioner. However, when a high-efficiency particulate air (HEPA) filter for use in an air purifier is mounted in the air conditioner, the HEPA filter acts as resistance to a flow of air to a heat exchanger. Therefore, it is difficult to use a HEPA filter in an air conditioner.

Korean Patent Laid-Open Publication No. 10-2012-0034446, which is hereby incorporated by reference, discloses a structure in which a separate air conditioner is disposed in a lower space in a stand-type air conditioner. This structure enables individual air conditioning for a lower region and an upper region in an indoor space. However, it is difficult to perform air conditioning and air purification for overlapping regions.

An air-processing apparatus mounted on a ceiling of an indoor space has a structure in which an inlet and an outlet are open in a downward direction. Korean Patent Laid-Open Publication No. 10-2009-0081607, which is hereby incorporated by reference, discloses a ceiling-mounted air-processing apparatus. This ceiling-mounted structure, however, makes it difficult for a user to reach the ceiling to replace a filter disposed in an inlet.

Korean Patent Laid-Open Publication No. 10-2020-0144534, which is hereby incorporated by reference, discloses structure that removes a filter, mounted to a suction panel, downwards together with the suction panel using a wire. This structure, however, makes it necessary to move the suction panel together with the filter when replacing the filter.

BRIEF DESCRIPTION OF THE DRAWINGS

Embodiments will be described in detail with reference to the following drawings in which like reference numerals refer to like elements, and wherein.

DETAILED DESCRIPTION

Figure 1:
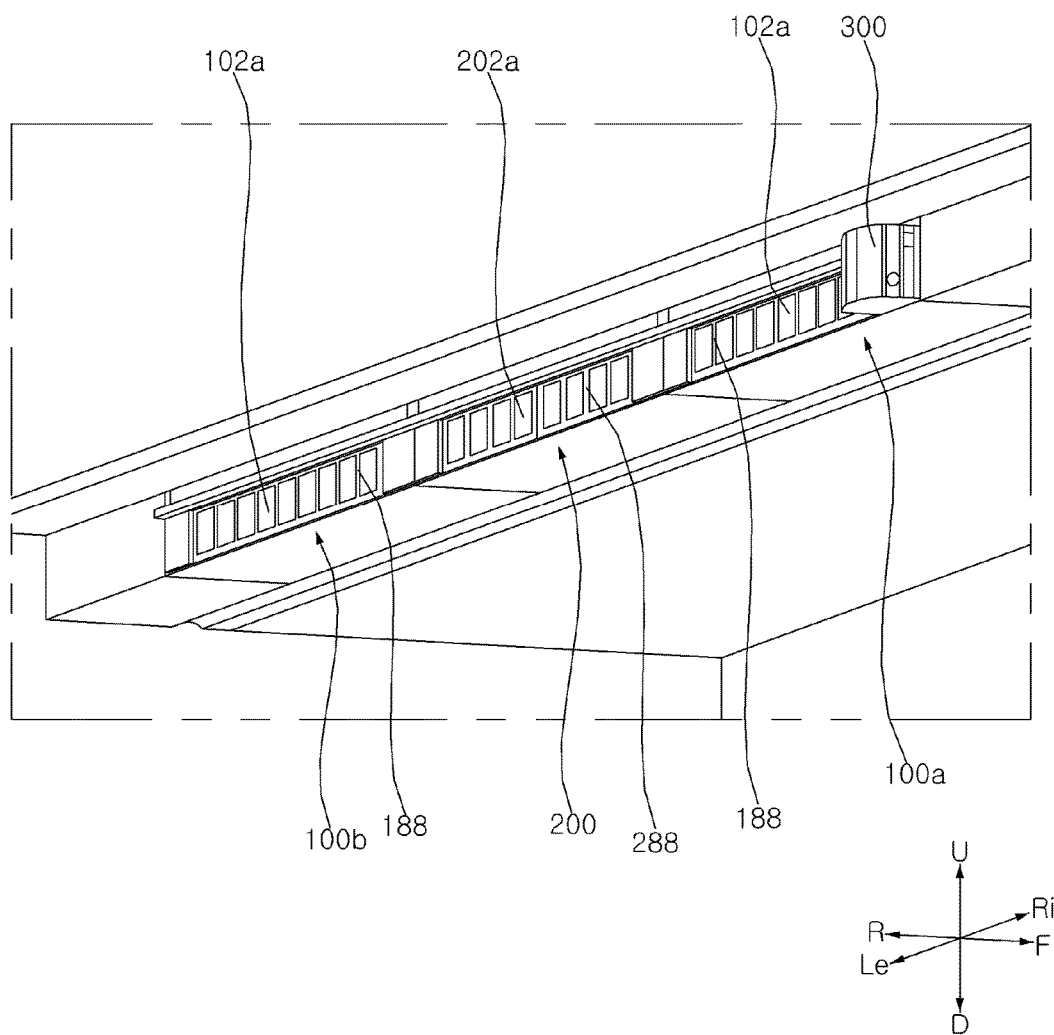
FIG. 1 is a perspective view of a first air-processing apparatus, a second air-processing apparatus, and a filter cleaner according to an embodiment disposed in an indoor space.

Advantages and features and methods for achieving them will be made clear from embodiments described below with reference to the accompanying drawings. The embodiments may, however, be embodied in many different forms, and should not be construed as being limited to the embodiments set forth herein. Rather, these embodiments are provided so that this disclosure will be thorough and complete, and will fully convey the scope to those skilled in the art. The embodiments are defined only by the scope of the claims. Throughout the specification, the same or like reference numerals represent the same or like components.

The terms "U", "D", "Le", "Ri", "F", and "R" shown in FIGS. 1 to 35C indicate an upward direction, a downward direction, a leftward direction, a rightward direction, a forward direction, and a rearward direction, respectively. The aforementioned directions are used only for convenience of description, and are not intended to limit the scope of the disclosure. Thus, the aforementioned directions may be set differently according to some reference.

Hereinafter, an air-conditioning system according to an embodiment will be described with reference to the accompanying drawings.

An air-conditioning system according to an embodiment may include a first air-processing apparatus 100, which adjusts a temperature of air through heat exchange between the air and a refrigerant, and a second air-processing apparatus 200, which is disposed on one side of the first air-processing apparatus in order to remove foreign substances from the air. The air-conditioning system according to an embodiment may include a plurality of air-processing apparatuses 100a, 100b, and 200. The air-conditioning system according to an embodiment may include one or two or more first air-processing apparatuses 100a and 100b and one or two or more second air-processing apparatuses 200.

The air-conditioning system according to an embodiment may include a filter cleaner 300, which moves along a surface in which inlets 102a and 202a of the plurality of air-processing apparatuses 100a, 100b, and 200 are formed in order to clean pre-filters 188 and 288 disposed in the inlets 102a and 202a.

Referring to FIG. 1, the air-conditioning system according to an embodiment may include one second air-processing apparatus 200 and two first air-processing apparatuses 100 disposed on both sides of the second air-processing apparatus 200. However, this is merely illustrative, and a numbers and arrangement of first and second air-processing apparatuses 100 and 200 may be set differently.

Figure 2:
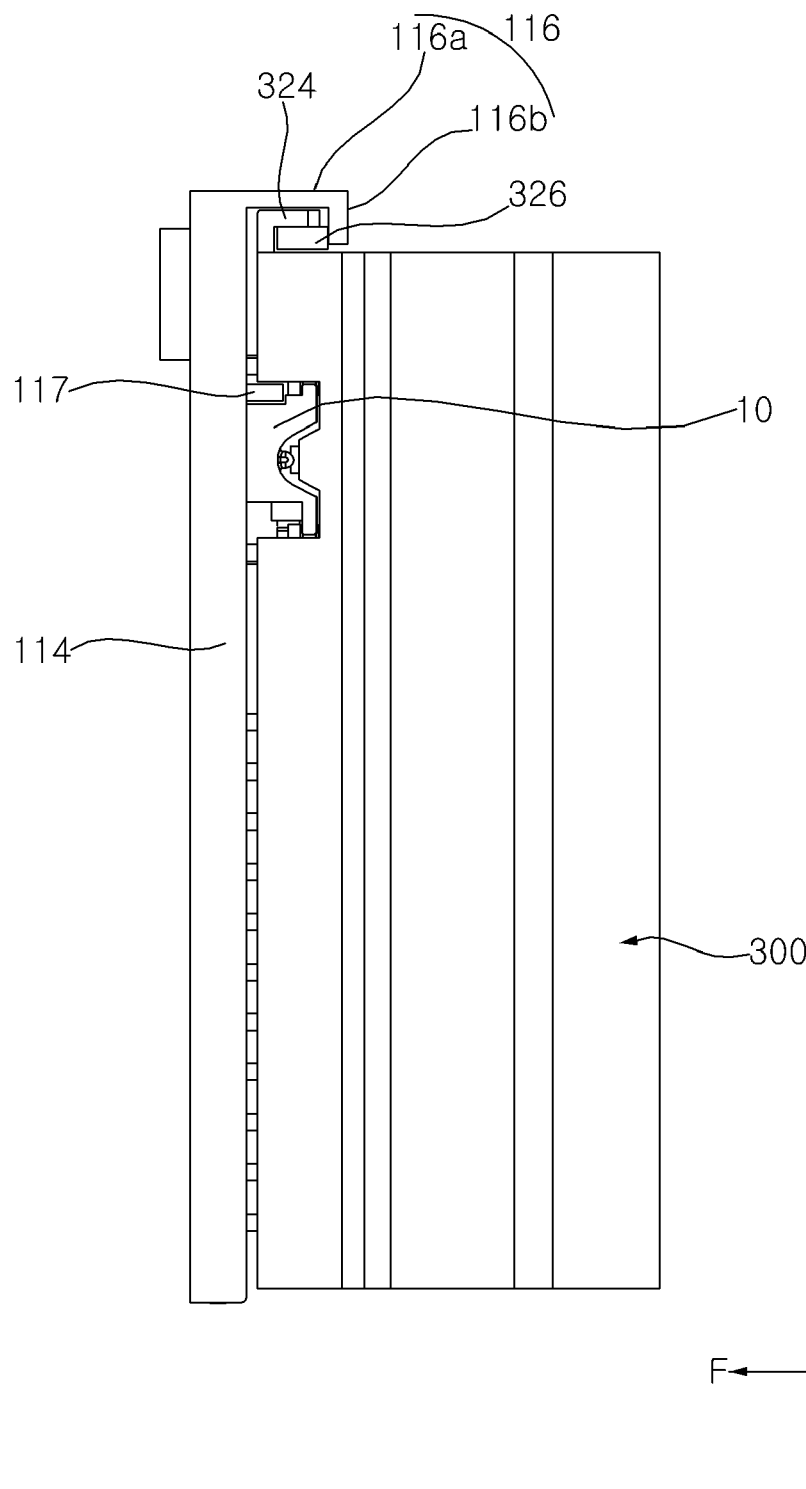
FIG. 2 is a side view for explaining a filter cleaner disposed behind a first air-processing apparatus or a second air-processing apparatus according to an embodiment.
Figure 3:
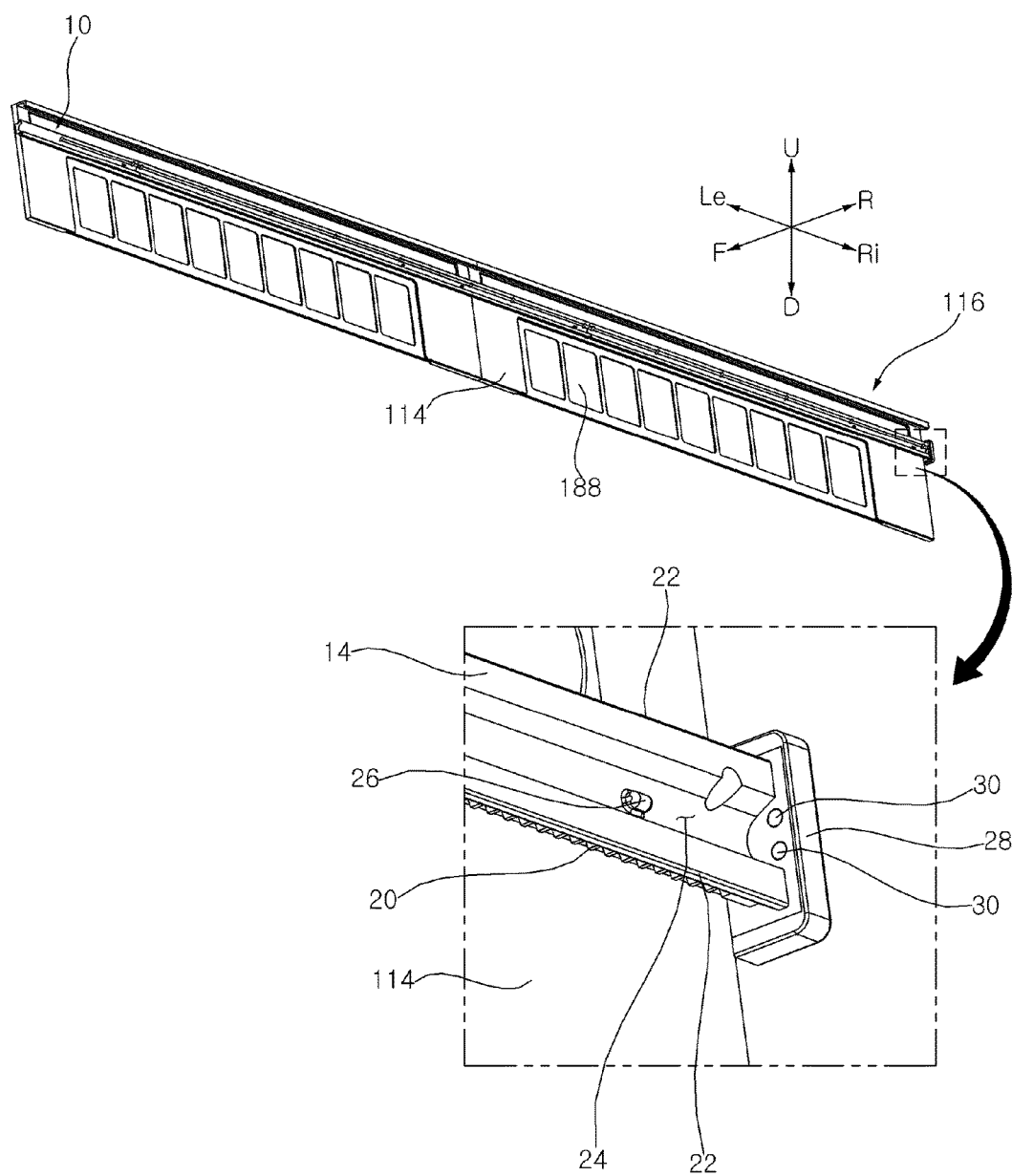
FIG. 3 is a perspective view for explaining a guide rail disposed behind a first air-processing apparatus and a second air-processing apparatus according to an embodiment.
Figure 4:
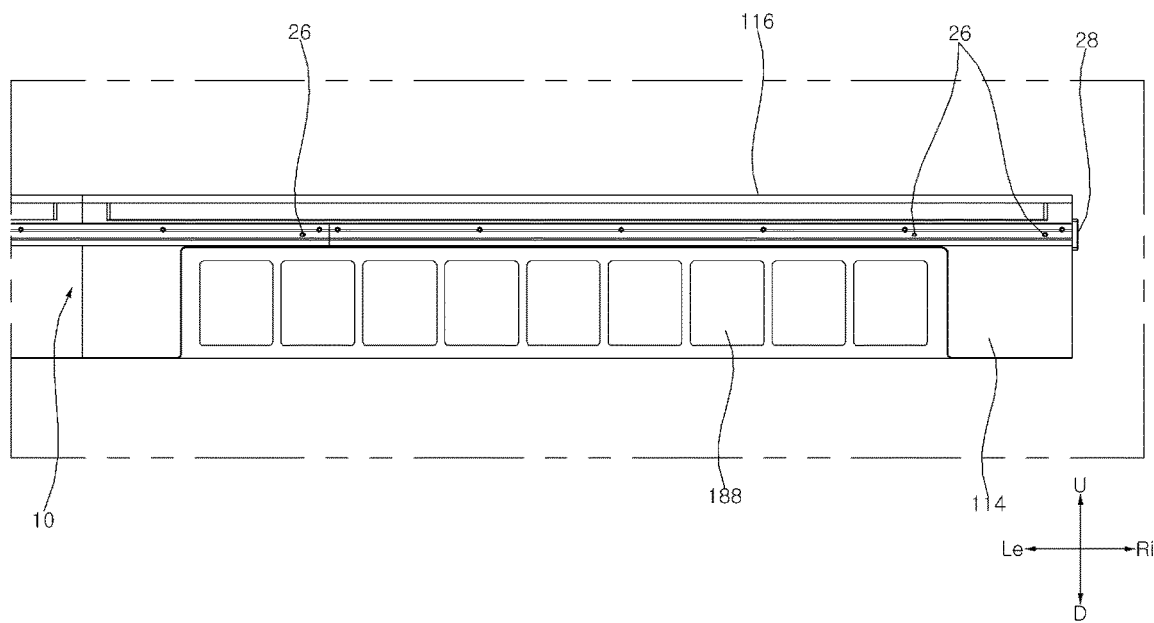
FIG. 4 is a rear view of the guide rail of FIG. 3.

Referring to FIG. 2, the air-conditioning system may include a guide rail 10, which is disposed at the rear sides of the first air-processing apparatuses 100 and the second air-processing apparatus 200 in order to guide movement of the filter cleaner 300. Support rails 116 and 244 that support movement of the filter cleaner 300 may be disposed at upper ends of rear surfaces of the first air-processing apparatuses 100 and the second air-processing apparatus 200.

The support rails may include first support rails 116 disposed at the first air-processing apparatuses 100 and second support rail 244 disposed at the second air-processing apparatus 200. The first support rails 116 may be formed integrally with first rear covers 114 (refer to FIG. 8) of the first air-processing apparatuses 100, which will be described hereinafter. The second support rail 244 may be formed integrally with a second rear cover 242 (refer to FIG. 20) of the second air-processing apparatus 200, which will be described hereinafter.

The guide rail 10 may be disposed on rear sides of the first rear covers 114 and the second rear cover 242. The guide rail 10 may be disposed above the first inlets 102a and the second inlet 202a. The guide rail 10 may extend in a lateral or leftward-rightward direction on the rear sides of the first rear covers 114 and the second rear cover 242. The guide rail 10 may be fixedly disposed below first rail-fixing protrusions 117 of the first rear covers 114 and a second rail-fixing protrusion 245 of the second rear cover 242.

The guide rail 10 may include a gear rail 20, which has threads to be engaged with a moving gear (not shown) of the filter cleaner 300, and a roller rail 22, which is in contact with a guide roller (not shown) of the filter cleaner 300.

The roller rail 22 may be disposed behind the gear rail 20. The roller rail 22 may be disposed at each of an upper side and a lower side of the guide rail 10. The gear rail 20 may be disposed in front of the roller rail 22. The gear rail 20 may be formed on a lower surface of the guide rail 10. The gear rail 20 may have a shape of a rack gear. When viewed from the rear, the guide rail 10 may have a structure in which the gear rail 20 is shielded by the roller rail 22.

A rail groove 24 may be formed in a rear surface of the guide rail 10. The rail groove 24 may be recessed in a forward direction and extend in the lateral direction. An object to be sensed 26 may be disposed in the rail groove 24. A plurality of the object to be sensed 26 may be provided, and the plurality of objects to be sensed may be spaced apart from each other in the lateral direction. A sensor (not shown) may be disposed at the filter cleaner 300, and when the sensor senses the object to be sensed 26, a position of the filter cleaner 300 may be detected.

The object to be sensed 26 may correspond to the sensor. For example, when the sensor is a switch sensor, the object to be sensed 26 may have a shape of a protrusion that protrudes rearwards. Alternatively, when the sensor is a Hall sensor, the object to be sensed 26 may be implemented as a magnet.

An end plate 28 configured to limit movement of the filter cleaner 300 in one direction may be disposed at a left end or a right end of the guide rail 10. The end plate 28 may extend in a direction perpendicular to a direction in which the guide rail 10 extends. The end plate 28 may protrude rearwards from the rear cover 114.

The end plate 28 may be provided with a charging terminal 30, with which a connection terminal 320 of the filter cleaner 300 is brought into contact. The charging terminal 30 protrudes from the end plate 28 in the direction in which the guide rail 10 extends. Accordingly, when the filter cleaner 300 reaches the end plate 28, the connection terminal 320 of the filter cleaner 300 may be brought into contact with and connected to the charging terminal 30.

Hereinafter, a first air-processing apparatus according to an embodiment will be described with reference to FIGS. 5 to 17C.

Figure 5:
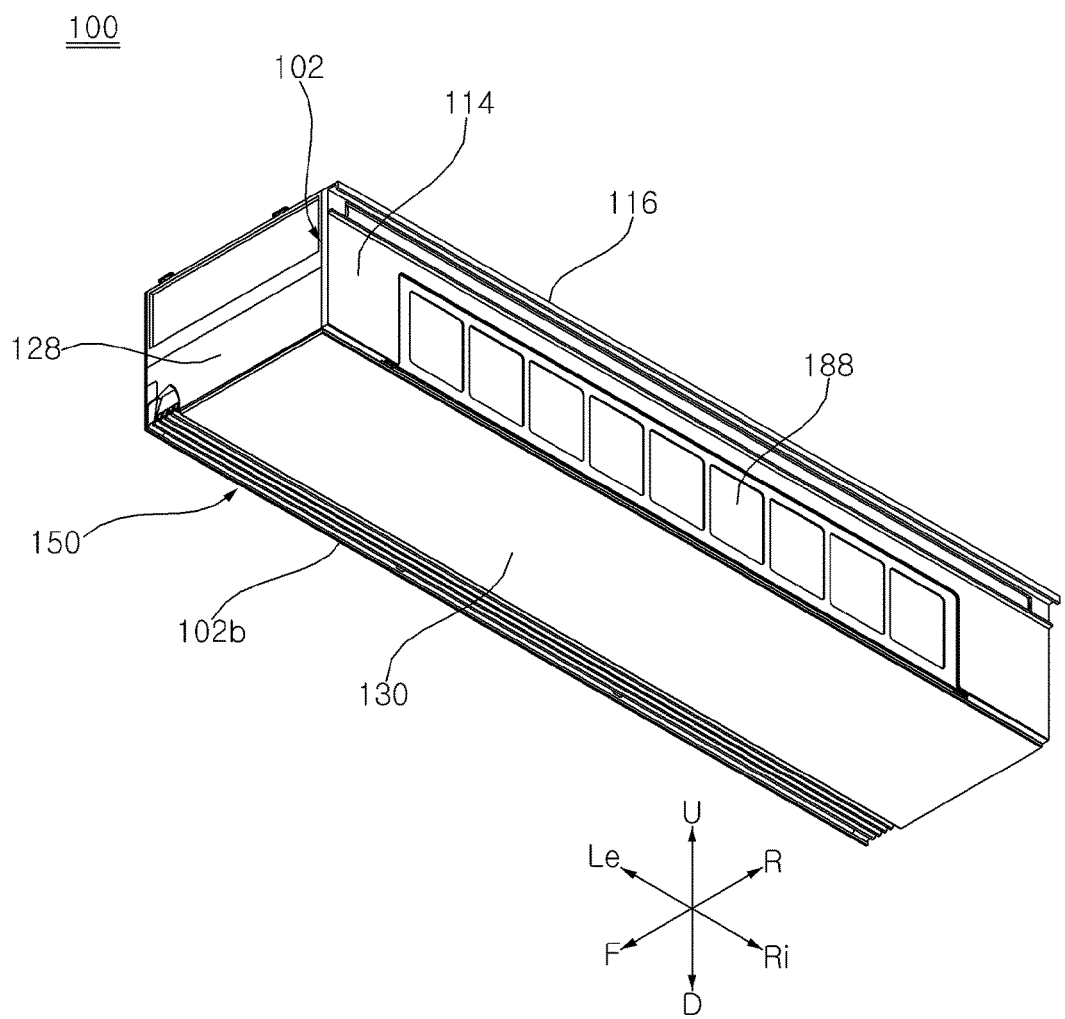
FIG. 5 is a perspective view of a first air-processing apparatus according to an embodiment.

The first air-processing apparatus 100 induces air to exchange heat with a refrigerant and discharges the heat-exchanged air to the outside. The first air-processing apparatus 100 may include first inlet 102a formed in one or a first side thereof in order to suction air thereinto and a first outlet 102b formed in another or a second side thereof perpendicular to the first inlet 102a in order to discharge air therefrom. Referring to FIG. 5, the first inlet 102a may be formed so as to be perpendicular to a surface of a floor or ceiling. The first outlet 102b may be open downwards. The first outlet 102b may extend perpendicular to the first inlet 102a.

Figure 6:
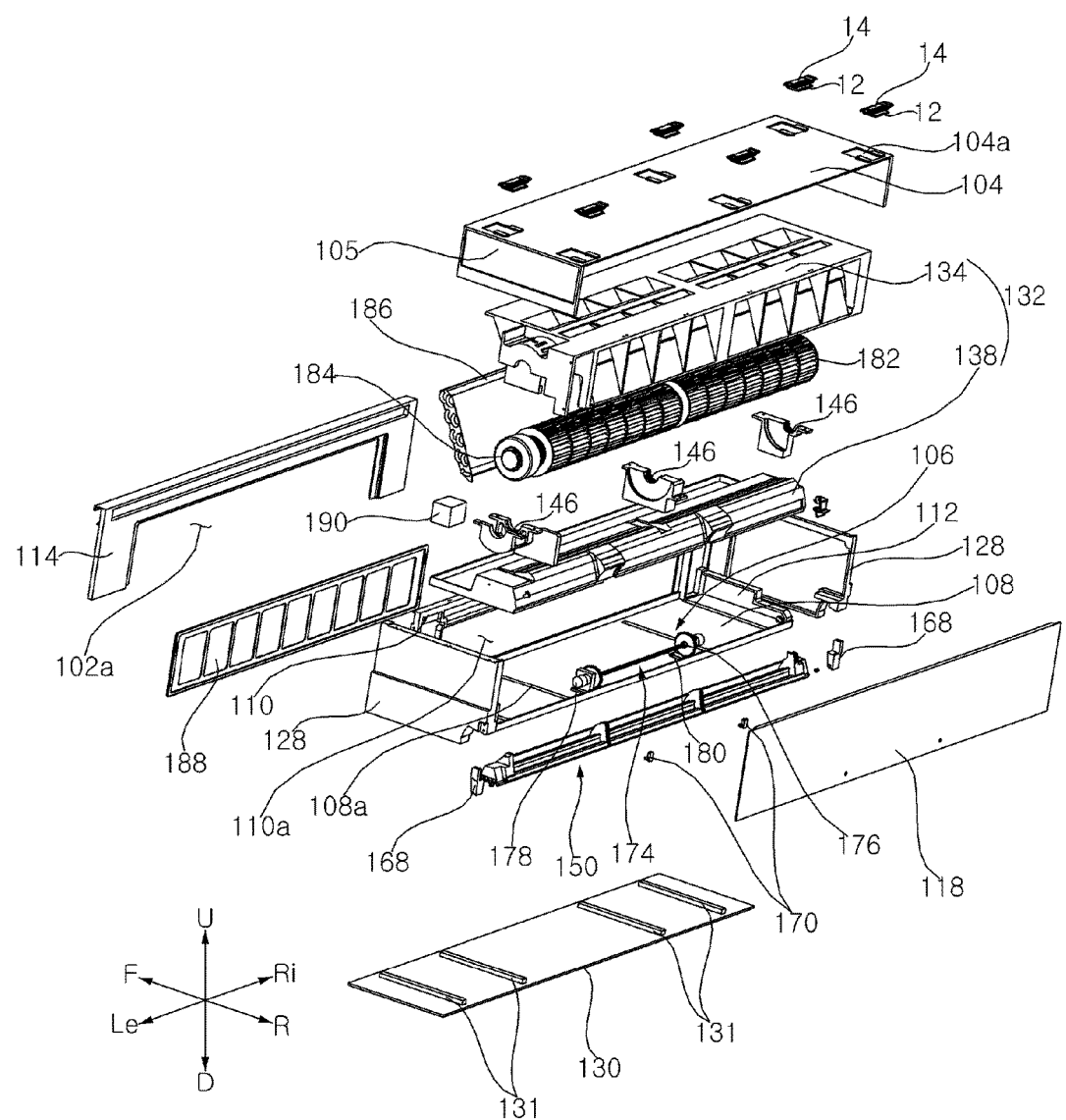
FIG. 6 is an exploded perspective view of the first air-processing apparatus of FIG. 5.
Figure 7:
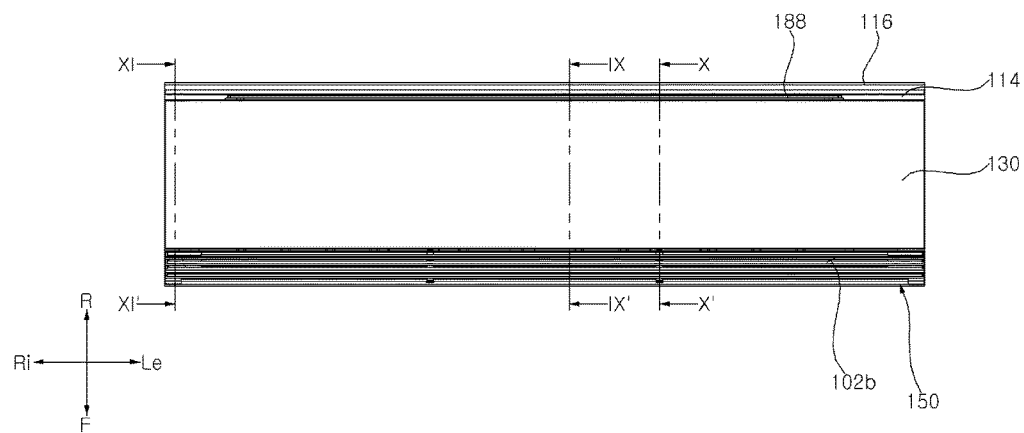
FIG. 7 is a bottom view of the first air-processing apparatus of FIG. 5.
Figure 8:
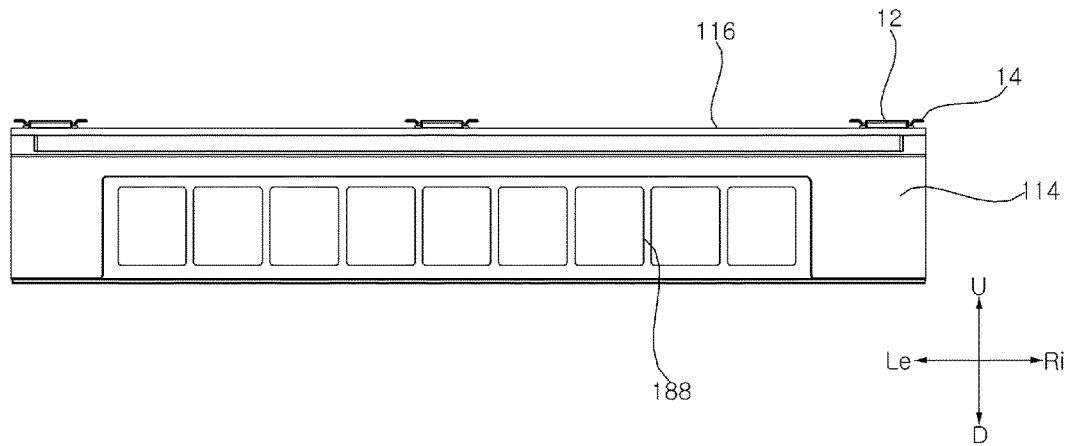
FIG. 8 is a rear view of the first air-processing apparatus of FIG. 5.

Referring to FIG. 6, the first air-processing apparatus 100 may include a first fan 182, which causes air to flow, a first fan motor 184, which rotates the first fan 182, and a heat exchanger 186, through which a refrigerant flows to exchange heat with air. The first air-processing apparatus 100 may further include a first case 102, which forms an external appearance of the first air-processing apparatus 100, and a first housing 132, which is disposed inside of the first case 102 and which forms a flow path through which air flows. The first air-processing apparatus 100 may further include a first louver 150, which is rotatably disposed in the first case 102 in order to adjust a direction of air that is discharged from the first outlet 102b, and a first louver actuator 174, which changes an orientation of the first louver 150. The first air-processing apparatus 100 may also include a first control box 190 that controls operation of the first fan motor 184 or operation of the first louver actuator 174.

Referring to FIG. 6, the first case 102 may include a first upper cover 104, which may be secured to a ceiling, a first lower cover 106, which is disposed below the first upper cover 104, a first rear cover 114, in which is formed therein the first inlet 102a and to which first pre-filter 188 is mounted, a first front cover 118, which is spaced forwards apart from the first rear cover 114, and two first side covers 128, which are disposed at both side ends of the first lower cover 106. Referring to FIG. 6, the first case 102 may further include a first bottom cover 130, which is disposed below the first lower cover 106.

Referring to FIG. 6, the first inlet 102a may be formed in the first rear cover 114. The guide rail 10 may be mounted on an outer surface of the first rear cover 114. The first inlet 102a may be formed in a lower portion of the first rear cover 114. The first pre-filter 188 may be mounted in the first inlet 102a formed in the first rear cover 114. The guide rail 10 and the first support rail 116 that guides movement of the filter cleaner 300 may be mounted on the first rear cover 114.

Referring to FIG. 2, the guide rail 10 may be disposed above the first inlet 102a. The first support rail 116 may be disposed at an upper end of the first rear cover 114. The guide rail 10 may be provided separately from the first rear cover 114. The first support rail 116 may be formed integrally with the first rear cover 114.

Figure 9:
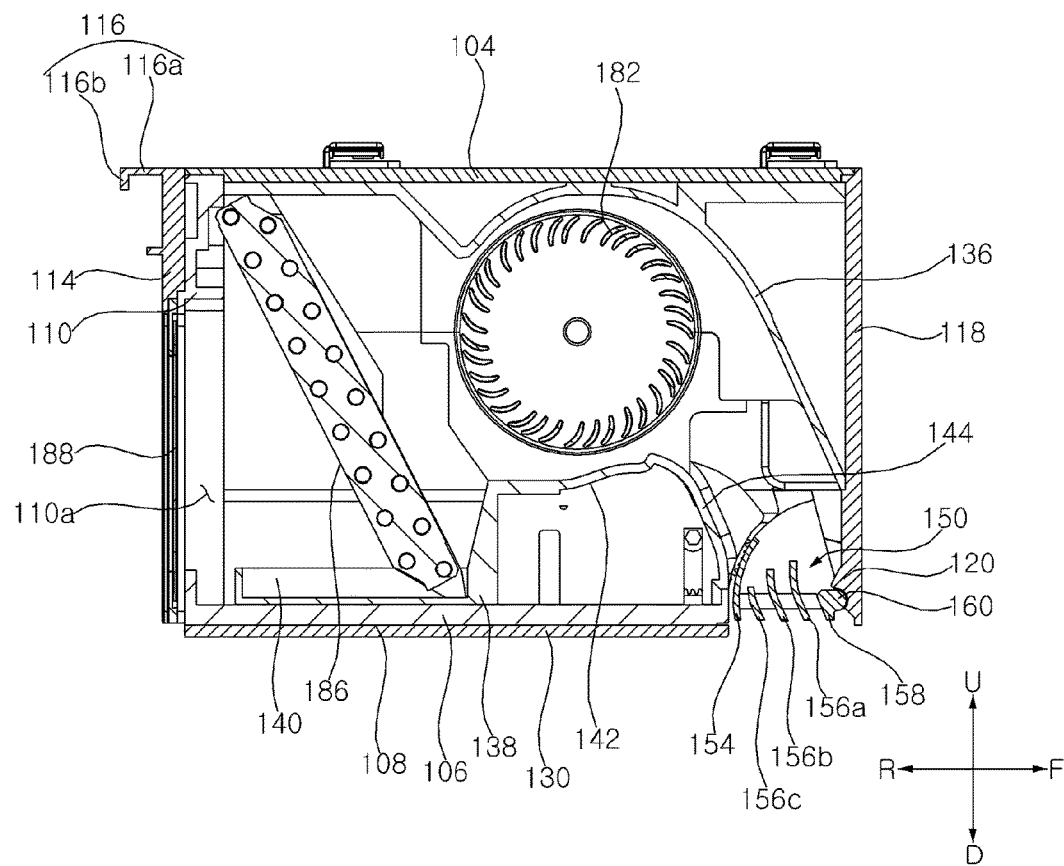
FIG. 9 is a cross-sectional view, taken along line IX-IX' in FIG. 7.

Referring to FIG. 9, the first support rail 116 may include a first top plate 116a, which protrudes rearwards from the upper end of the first rear cover 114, and a first bent portion 116b, which is bent and extends downwards from the rear end of the first top plate 116a. A top roller 326 (refer to FIG. 2) of the filter cleaner 300 may be in contact with the first bent portion 116b.

Referring to FIG. 9, the first rear cover 114 may be disposed behind a first vertical plate 110 of the first lower cover 106, which will be described hereinafter. The first rear cover 114 may be fixedly disposed behind the first vertical plate 110.

Referring to FIG. 6, the first upper cover 104 may include a first fixing recess 104a formed in an upper surface thereof, into which a fixing member 12 that fixes the first case 102 to the ceiling may be inserted. Referring to FIG. 6, a plurality of first fixing recesses 104a may be formed in the upper surface of the first upper cover 104. The fixing member 12 may be inserted into and fixed to each of the plurality of first fixing recesses 104a. The fixing member 12 may have a substantial "[" shape when viewed from the side. The fixing member 12 may be connected to a mounting member 14 that is fixed to the ceiling, thereby fixing the first case 102 to the ceiling.

The first upper cover 104 may include two side plates 105, which are bent and extend downwards from both side ends thereof. Each of the two side plates 105 may be connected to a respective one of the two first side covers 128.

Referring to FIG. 6, the first lower cover 106 may be disposed below the first housing 132. The first louver actuator 174 may be disposed on the first lower cover 106. The first lower cover 106 may include a first horizontal plate 108, which is disposed above the first bottom cover 130, first vertical plate 110, which is disposed at a rear side of the first horizontal plate 108 so as to be perpendicular thereto and in which a first inner suction hole 110a may be formed, and two first side walls 112, which are bent and extend upwards from both side ends of the first horizontal plate 108.

The first louver actuator 174 may be disposed on the first horizontal plate 108. The first horizontal plate 108 may include a connection slit 108a formed therein to allow a vertical protrusion 131 of the first bottom cover 130 to be inserted thereinto.

Referring to FIG. 6, each of the two first side covers 128 may be connected at a lower portion thereof to the first lower cover 106, and connected at an upper portion thereof to the first upper cover 104. A first rotational support rod 168 that supports rotation of the first louver 150 may be disposed on each of the two first side covers 128. The first rotational support rod 168 may be connected to each of both ends of the first louver 150, thereby supporting rotation of the first louver 150.

Referring to FIG. 9, the first front cover 118 may be disposed in front of the first housing 132. Referring to FIG. 9, a lower end of the first front cover 118 may be spaced a predetermined gap apart from a front end portion 106a of the first lower cover 106. The first outlet 102b may be formed between the first front cover 118 and the first lower cover 106. A first louver protrusion 120, in which a first louver groove 122 configured to receive a louver rotational shaft 160 is formed, may be formed on the first front cover 118 in order to limit a range within which the first louver 150 may rotate.

The first louver protrusion 120 may extend lengthwise in the lateral direction, in which the first front cover 118 is formed. Referring to FIG. 14B, the first louver protrusion 120 has the first louver groove 122 formed therein to allow the louver rotational shaft 160 of the first louver 150 to be disposed therein. The first louver groove 122 may extend lengthwise in the lateral direction, in which the first louver protrusion 120 extends.

Figure 14A:
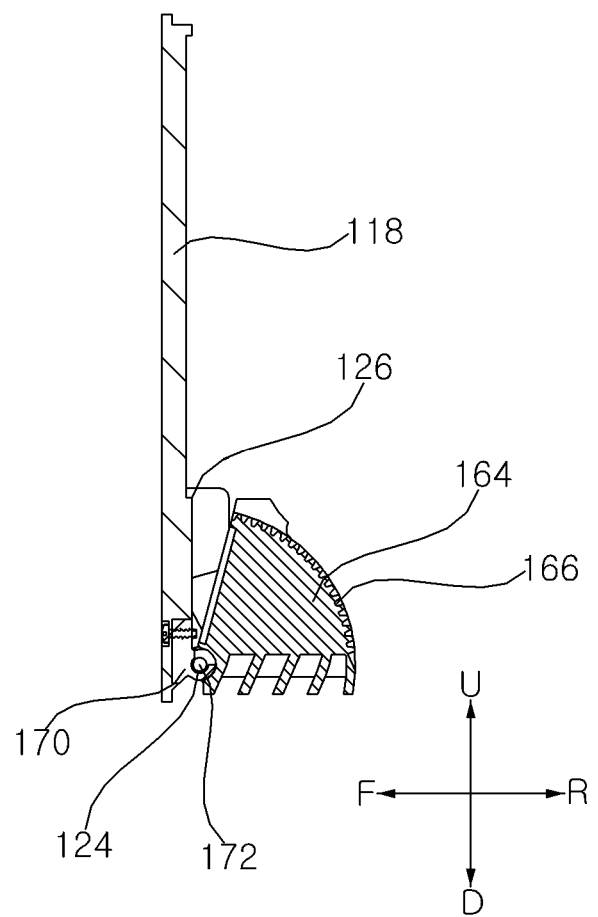
FIG. 14A is a cross-sectional view, taken along line XIVA-XIVA' in FIG. 13.
Figure 14B:
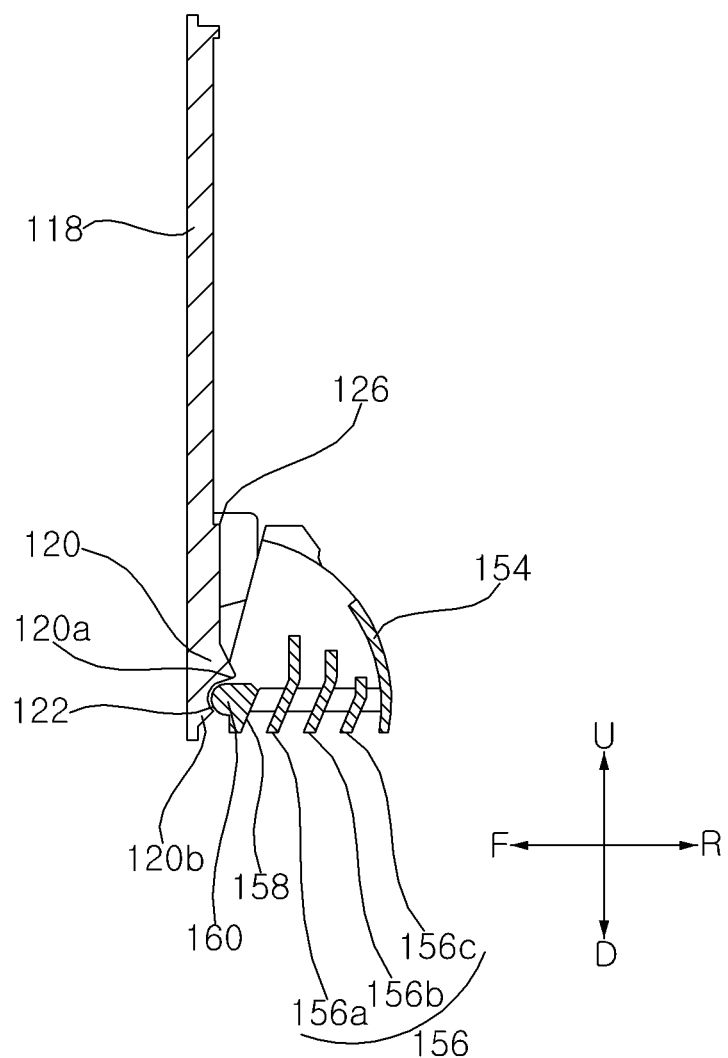
FIG. 14B is a cross-sectional view, taken along line XIVB-XIVB' in FIG. 13.
Figure 15:
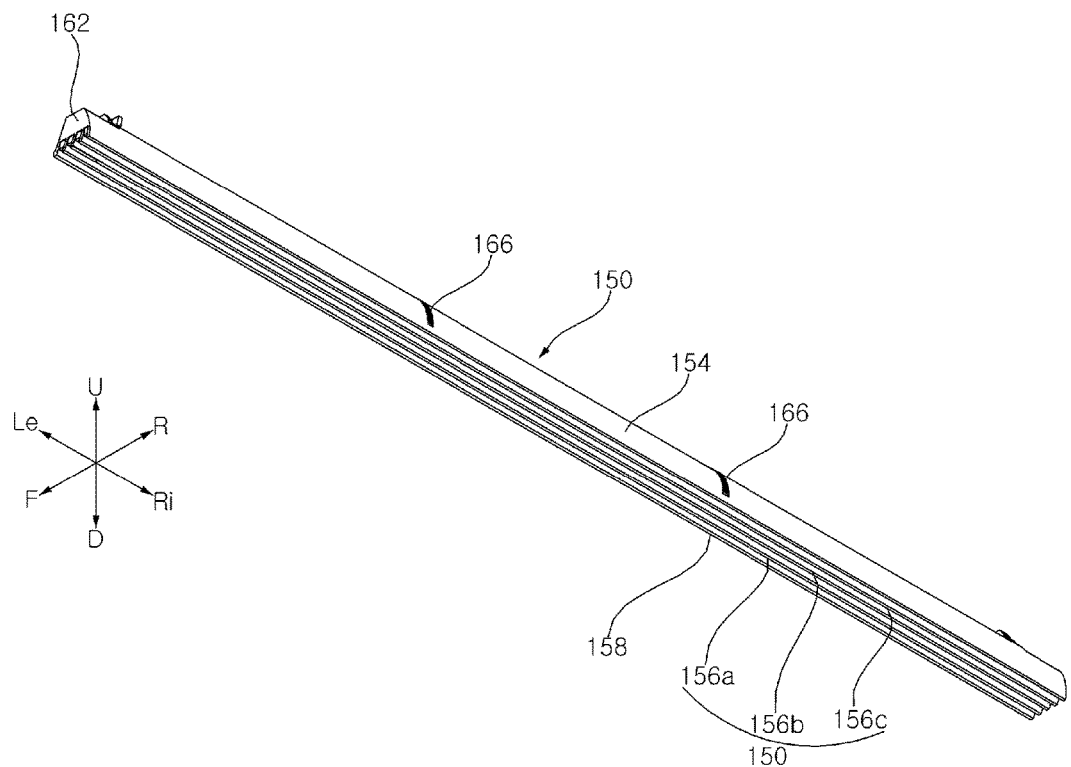
FIG. 15 is a perspective view of a louver according to an embodiment.

Referring to FIG. 14A, a first support-rod recess 124 in which a first auxiliary support rod 170 may be disposed is formed between a left or first end and a right or second end of the first louver protrusion 120. The first auxiliary support rod 170 may be fixedly disposed on the first front cover 118, and may support rotation of the first louver 150. The first auxiliary support rod 170 may be disposed between two first rotational support rods 168, which will be described hereinafter. The first auxiliary support rod 170 may be connected to the first louver 150 via a first auxiliary rotational shaft 172.

Referring to FIG. 14B, the first louver protrusion 120 may include an upper protruding portion 120a, which forms a surface that is inclined from an upper end of the first louver groove 122 in a rearward-upward direction, and a lower protruding portion 120b, which forms a surface that is inclined from a lower end of the first louver groove 122 in a forward-downward direction.

When the upper surface of the louver rotational shaft 160 of the first louver 150, which will be described hereinafter, comes into contact with the upper protruding portion 120a, rotation of the first louver 150 in one direction is limited by the upper protruding portion 120a. When an axial vane 158 of the first louver 150, which will be described hereinafter, comes into contact with the lower protruding portion 120b, rotation of the first louver 150 in the opposite direction is limited by the lower protruding portion 120b.

Referring to FIG. 14B, a first stepped portion or step 126, which interferes with an end portion of a first upper housing 134 described hereinafter, may be formed in the first front cover 118.

Referring to FIG. 9, the first housing 132 may be disposed inside of the first case 102, and form therein a space through which air flows. The first fan 182 and the heat exchanger 186 may be disposed inside of the first housing 132. Referring to FIG. 9, the heat exchanger 186 may be disposed in a region adjacent to the first inlet 102a. The heat exchanger 186 may be disposed so as to be inclined toward the first fan 182 to thereby increase a heat-exchange area and minimize resistance to air flow.

The first fan motor 184 that rotates the first fan 182 may be disposed inside of the first housing 132. The first fan motor 184 may be disposed on a rotational shaft of the first fan 182 in order to rotate the first fan 182. The first fan 182 may be implemented as, for example, a cross-flow fan, which is configured to suction air into one side thereof in a radial direction and to discharge air from another side thereof in the radial direction. Referring to FIG. 6, a fan support bracket 146 may be disposed inside of the first housing 132 in order to support rotation of the first fan 182 or to support placement of the first fan motor 184.

Referring to FIG. 6, the first housing 132 may include first upper housing 134, which is disposed above the first fan 182, and a first lower housing 138, which is disposed below the first fan 182. Referring to FIG. 9, the first upper housing 134 and the first lower housing 138 may form discharge guides 136 and 144, along which air flows from the first fan 182 to the first outlet 102b.

The first upper housing 134 may be mounted to the first upper cover 104. A lower end of the first upper housing 134 may be disposed at an upper side of the first stepped portion 126 of the first front cover 118. Referring to FIG. 9, the first upper housing 134 may include upper guide 136, along which air flowing out of the first fan 182 moves to the first outlet 102b. The upper guide 136 induces air flowing along the first fan 182 to move downwards. The upper guide 136 induces air flowing out of the first fan 182 to move toward the first front cover 118.

The first lower housing 138 may be disposed above the first lower cover 106. Referring to FIG. 9, the first lower housing 138 may include a drain pan 140, which is disposed below the heat exchanger 186 in order to collect therein condensation dropping from the heat exchanger 186. The drain pan 140 may be disposed below the heat exchanger 186 in a region in which the heat exchanger 186 is disposed.

Figure 10:
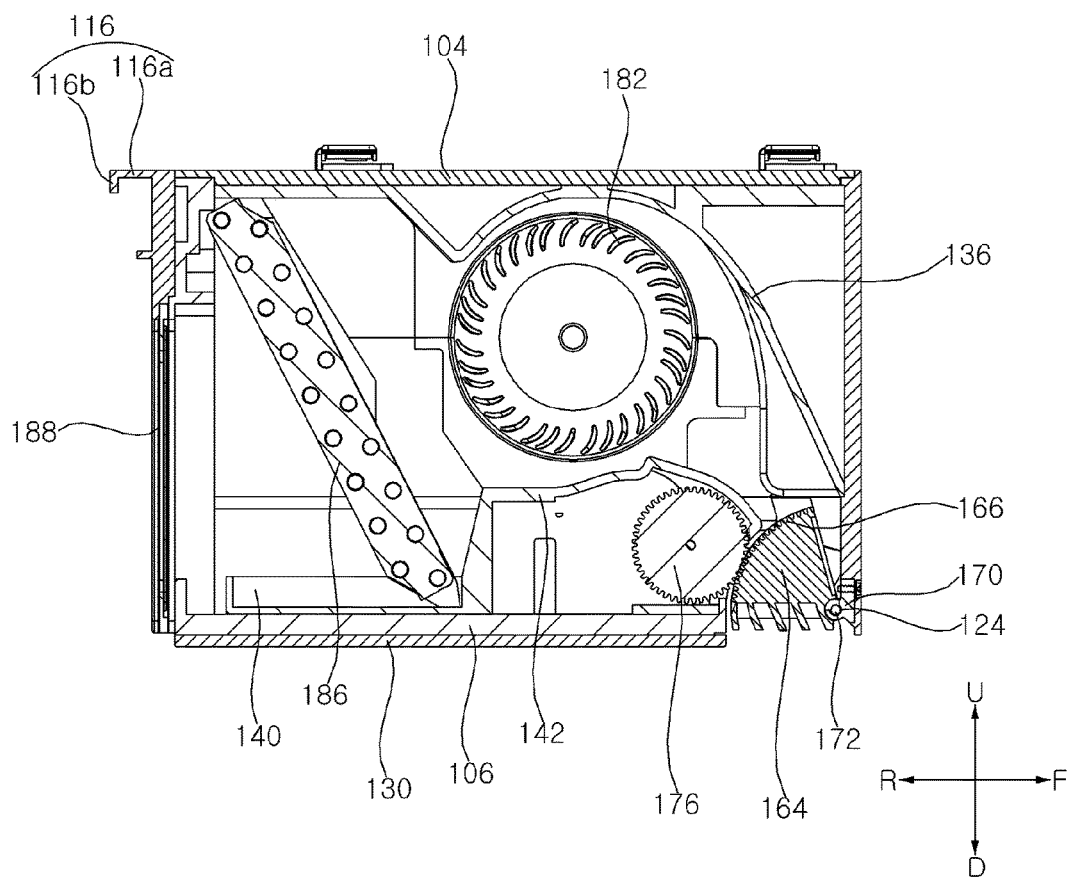
FIG. 10 is a cross-sectional view, taken along line X-X' in FIG. 7.

Referring to FIG. 10, the first lower housing 138 may include a drive device cover 142, which is disposed in front of the drain pan 140 and which protrudes upwards from the first lower cover 106. The drive device cover 142 forms a space thereunder in which the first louver actuator 174 may be disposed. The drive device cover 142 may protrude at an incline further upwards from a region in which the drain pan 140 is disposed to a region in which the first fan 182 is disposed. The drive device cover 142 may induce air passing through the heat exchanger 186 to flow to the region in which the first fan 182 is disposed.

The drive device cover 142 may include lower guide 144 that induces air passing through the first fan 182 to flow to the first outlet 102b. The lower guide 144 may be spaced apart from the upper guide 136 so as to form a discharge flow path 132a. The lower guide 144 may include a first gear hole 142a formed in a portion thereof corresponding to a region in which the first louver gear 176 of the first louver actuator 174 is disposed. Referring to FIG. 9, a portion of the first louver gear 176 may protrude outside of the first gear hole 142a and may be in contact with the first louver 150.

Figure 17:
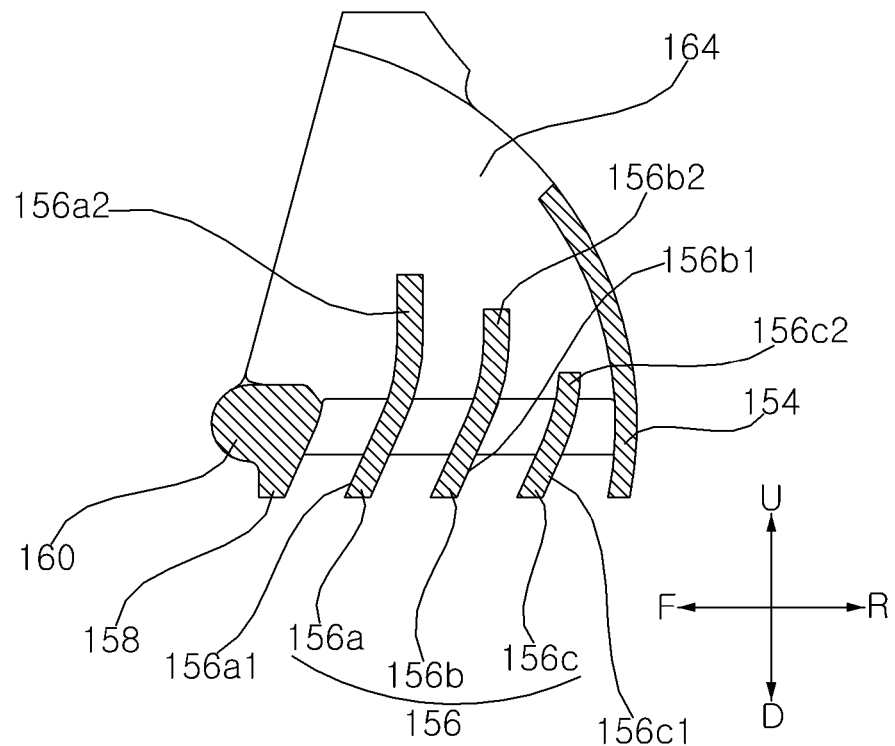
FIG. 17 is a cross-sectional view, taken along line XVII-XVII' in FIG. 16.

Referring to FIG. 6, the first air-processing apparatus 100 may include first louver 150, which is rotatably disposed in the first outlet 102b in order to adjust the direction of air blown out through the first outlet 102b, and first louver actuator 174 that adjusts the orientation of the first louver 150. Referring to FIG. 17, the first louver 150 may include a plurality of vanes 154, 156, and 158, which are spaced apart from each other in the radial direction based on the rotational shaft. Referring to FIG. 17, the first louver 150 may include louver rotational shaft 160, which extends along a rotational center of the first louver 150, outer vane 154, which is spaced outwards apart from the louver rotational shaft 160 in the radial direction, a plurality of inner vanes 156, which are spaced apart from each other in the radial direction between the louver rotational shaft 160 and the outer vane 154, and a vane gear 166, which is formed on an outer surface of the outer vane 154 in a circumferential direction.

The plurality of vanes 154, 156, and 158 may include the outer vane 154 and the plurality of inner vanes 156. Referring to FIG. 14B, the louver rotational shaft 160 may be disposed so as to be in contact with the first front cover 118. The louver rotational shaft 160 may be disposed in the first louver groove 122 in the first front cover 118. When the louver rotational shaft 160 rotates, the orientation of the plurality of vanes 154, 156, and 158, which are spaced apart from each other in the radial direction based on the louver rotational shaft 160, may be changed.

The louver rotational shaft 160 may include axial vane 158, which extends from the louver rotational shaft 160 in a direction parallel to the inner vanes 156. The axial vane 158 may extend in a direction parallel to lower portions of the inner vanes 156.

Figure 16:
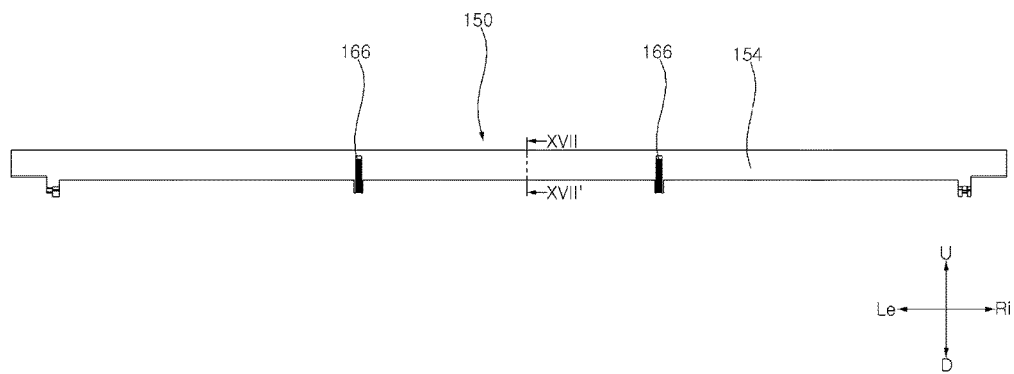
FIG. 16 is a rear view of the louver of FIG. 15.

Referring to FIG. 17, the outer vane 154 may be disposed farther from the louver rotational shaft 160 than the inner vanes 156. The outer vane 154 may be longer than the inner vanes 156 in the circumferential direction. Referring to FIG. 16, the outer vane 154 may be formed in the circumferential direction based on the louver rotational shaft 160.

Referring to FIG. 17, the inner vanes 156 may be disposed between the louver rotational shaft 160 and the outer vane 154 so as to be spaced apart from each other. The inner vanes 156 may be shorter than the outer vane 154. The inner vanes 156 may be longer than the axial vane 158.

Referring to FIG. 17, the inner vanes 156 have different lengths, respectively. The lengths of the inner vanes 156 gradually increase in a direction approaching the louver rotational shaft 160. The lengths of the inner vanes 156 gradually decrease in a direction approaching the outer vane 154.

Referring to FIG. 17, the inner vanes 156 may include lower inner vane portions 156*a*1, 156*b*1, and 156*c*1, which are inclined so as to be gradually closer to the louver rotational shaft 160 in the downward direction, and upper inner vane portions 156*a*2, 156*b*2, and 156*c*2, which are bent and extend upwards from upper ends of the lower inner vane portions 156*a*1, 156*b*1, and 156*c*1. The axial vane 158 extends in a direction parallel to the lower inner vane portions 156*a*1, 156*b*1, and 156*c*1.

The inner vanes 156 include first inner vane 156*a*, which is disposed closest to the louver rotational shaft 160, a second inner vane 156*b*, which is disposed farther from the louver rotational shaft 160 than the first inner vane 156*a*, and a third inner vane 156*c*, which is disposed farther from the louver rotational shaft 160 than the second inner vane 156*b*.

Figure 12:
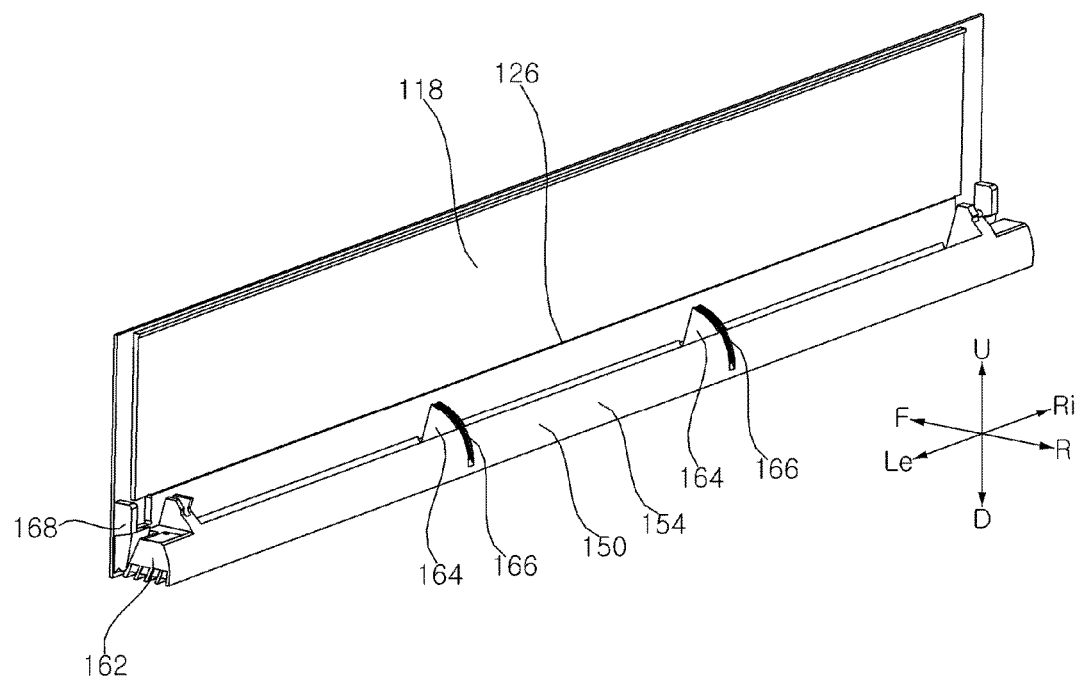
FIG. 12 is a perspective view showing a coupled state of a front cover and a louver according to an embodiment.
Figure 13:
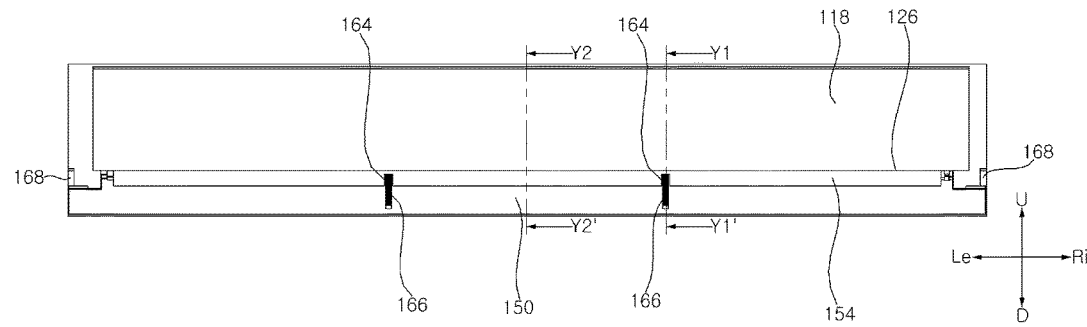
FIG. 13 is a rear view of the front cover and louver of FIG. 12.

Referring to FIG. 12, the first louver 150 may include end panels 162, which are disposed at both ends of the vanes 154, 156, and 158 in a direction perpendicular to the vanes 154, 156, and 158, and a support panel 164, which is disposed between the end panels 162. The vane gear 166 may be disposed on one side of the support panel 164. The end panels 162, which may be disposed at both ends of the vanes 154, 156, and 158, may prevent the air flowing through the first louver 150 from being discharged in the lateral direction.

The support panel 164, which is disposed between the end panels 162, may support the vanes 154, 156, and 158. The vanes 154, 156, and 158 may extend lengthwise in a longitudinal direction, in which the louver rotational shaft 160 is formed. Accordingly, the support panel 164 may stably maintain the arrangement of the vanes 154, 156, and 158.

Referring to FIG. 14A, the support panel 164 may be formed in a fan shape. The vane gear 166 may be disposed on an outer circumferential end of the support panel 164. The vane gear 166 may form threads on the outer circumferential end of the support panel 164 in the circumferential direction.

Referring to FIG. 14A, the support panel 164 may be connected to the first auxiliary support rod 170. The support panel 164 may form a space in which the first auxiliary support rod 170 is disposed in the portion in which the louver rotational shaft 160 is formed. The first auxiliary rotational shaft 172 may be disposed inside of the first auxiliary support rod 170, and the first auxiliary support rod 170 may be connected to the louver rotational shaft 160 via the first auxiliary rotational shaft 172.

The vanes 154, 156, and 158 may protrude downwards further than the end panels 162 and the support panel 164.

The first louver 150 may include an output interface 191 that displays an operational state of the first air-processing apparatus 100. The output interface 191 may provide visual or auditory information about the operational state of the first air-processing apparatus 100 to the user.

Figure 11:
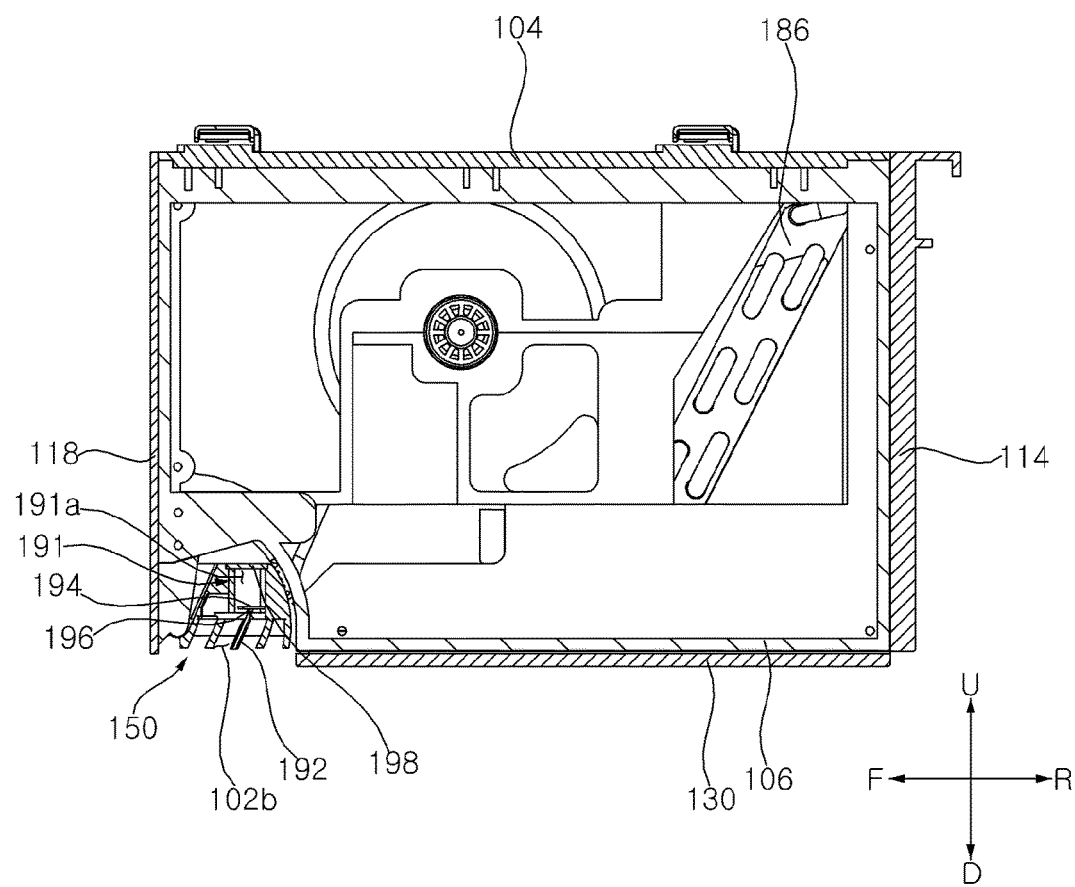
FIG. 11 is a cross-sectional view, taken along line XI-XI' in FIG. 7.

Referring to FIG. 11, the output interface 191 may visually display information about the operational state of the first air-processing apparatus 100. Also, the output interface 191 may output information about operational errors of the first air-processing apparatus 100.

The output interface 191 may include a lamp 196, a printed circuit board 194 that controls operation of the lamp 196, and a transparent panel 192 that transmits light radiated from the lamp 196 to the outside. The transparent panel 192 may be disposed on one of the vanes 154, 156, and 158. Referring to FIG. 11, the transparent panel 192 may be mounted on the inner vane 156.

The first louver 150 may have formed therein a space 191*a* in which the lamp 196 and the printed circuit board 194 may be disposed. The space 191*a* may be disposed above the transparent panel 192. A wiring hole 198, through which a wire connected to the printed circuit board 194 may pass, may be formed in an upper side of the space 191*a*.

The first louver actuator 174 may be spaced apart from the louver rotational shaft 160 of the first louver 150 in a centrifugal direction. The first louver actuator 174 may be spaced apart from the louver rotational shaft 160, and be disposed so as to be in contact with an outer circumferential surface of the first louver 150.

Referring to FIG. 6, the first louver actuator 174 may include a first louver gear 176, which is in contact with the first louver 150 in order to rotate the first louver 150, and a first louver motor 178 that rotates the first louver gear 176. According to this embodiment, two first louver gears 176 are provided so as to be spaced apart from each other, and the first louver actuator 174 further includes a first gear rotational shaft 180 that interconnects the two first louver gears 176. The two first louver gears 176, which are connected to each other via the first gear rotational shaft 180, may rotate in the same direction.

Figure 18A:
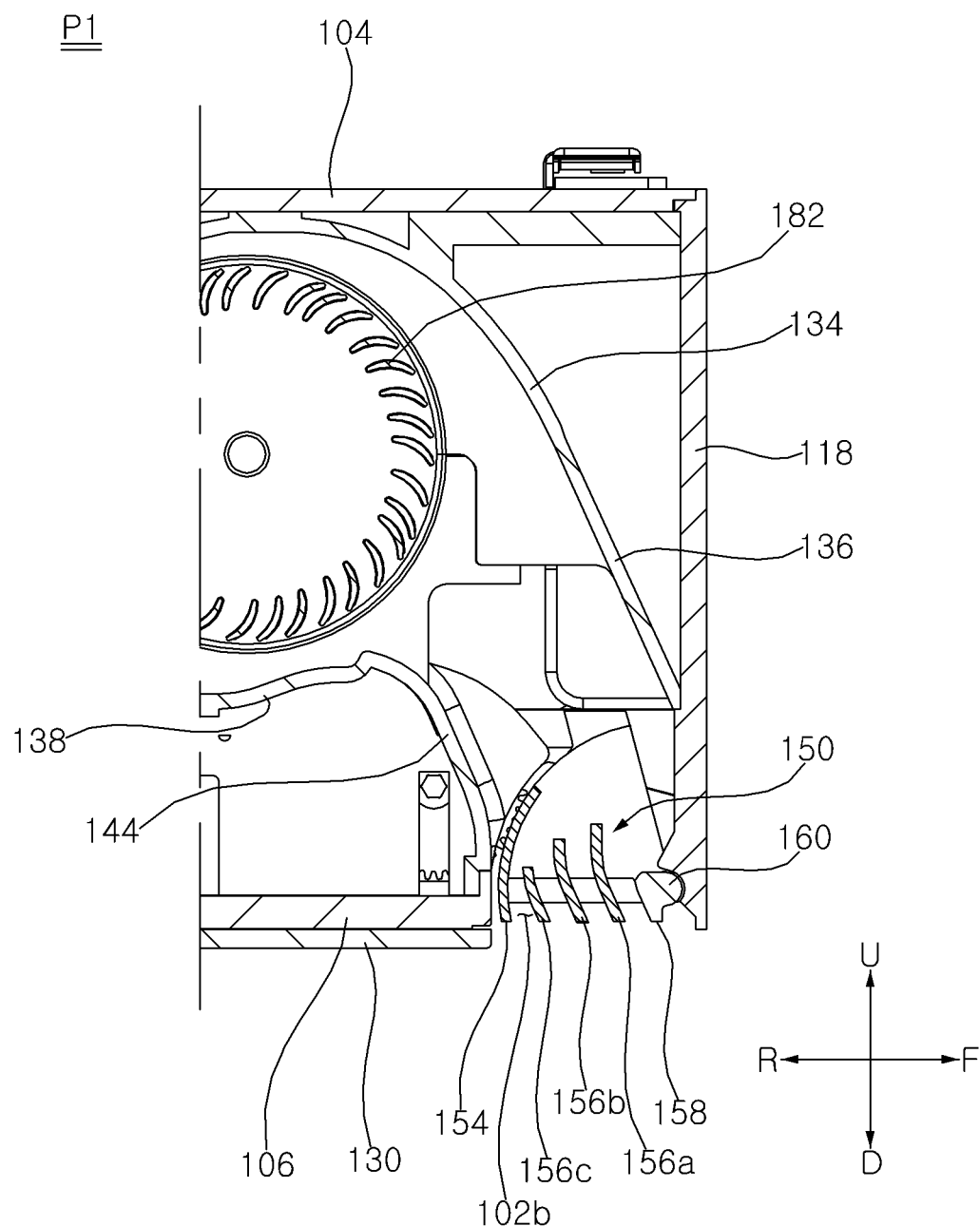
FIG. 18A is a cross-sectional view for explaining an orientation of a first louver in a first mode according to an embodiment.
Figure 18B:
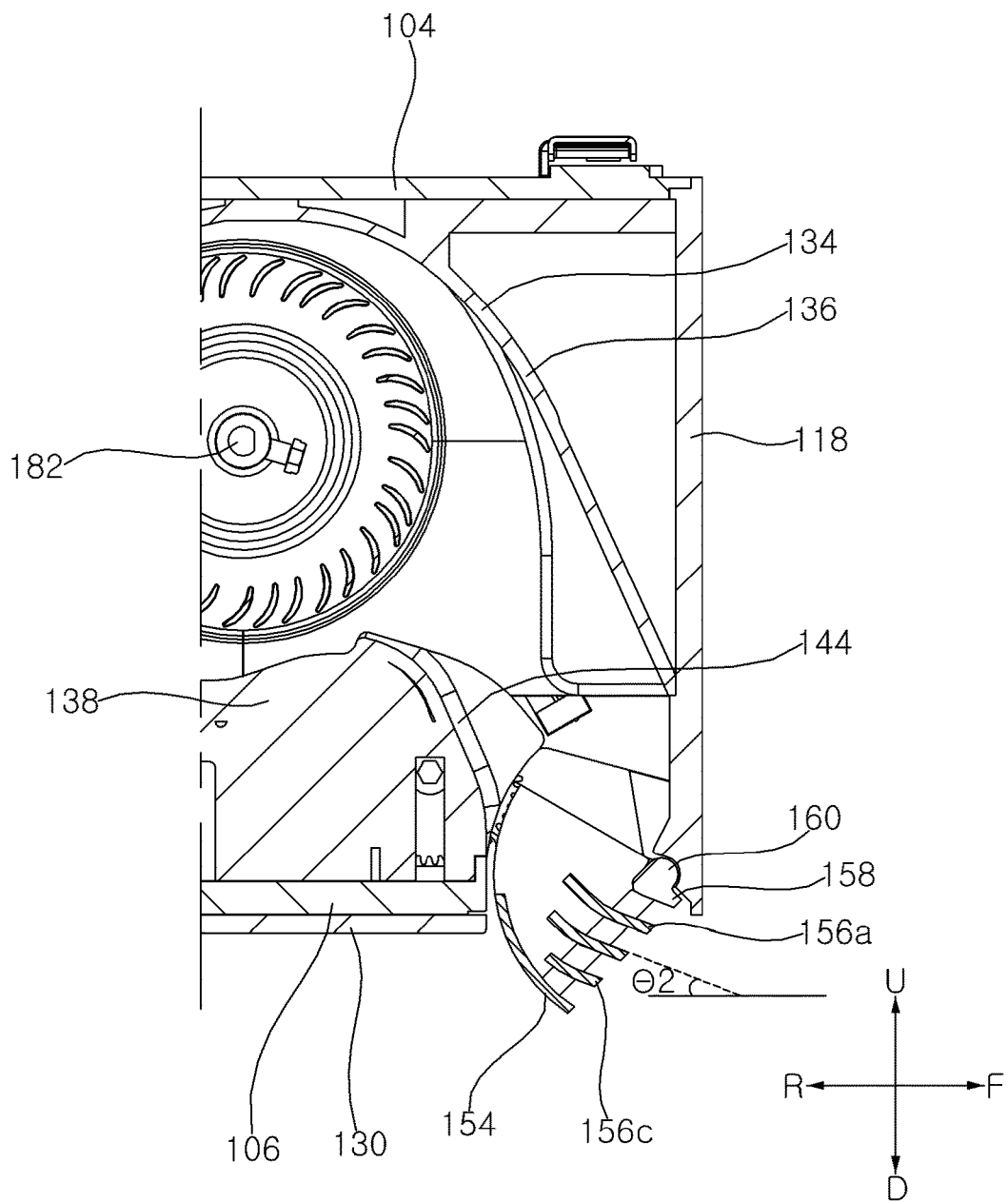
FIG. 18B is a cross-sectional view for explaining the orientation of the first louver in a second mode according to an embodiment.
Figure 18C:
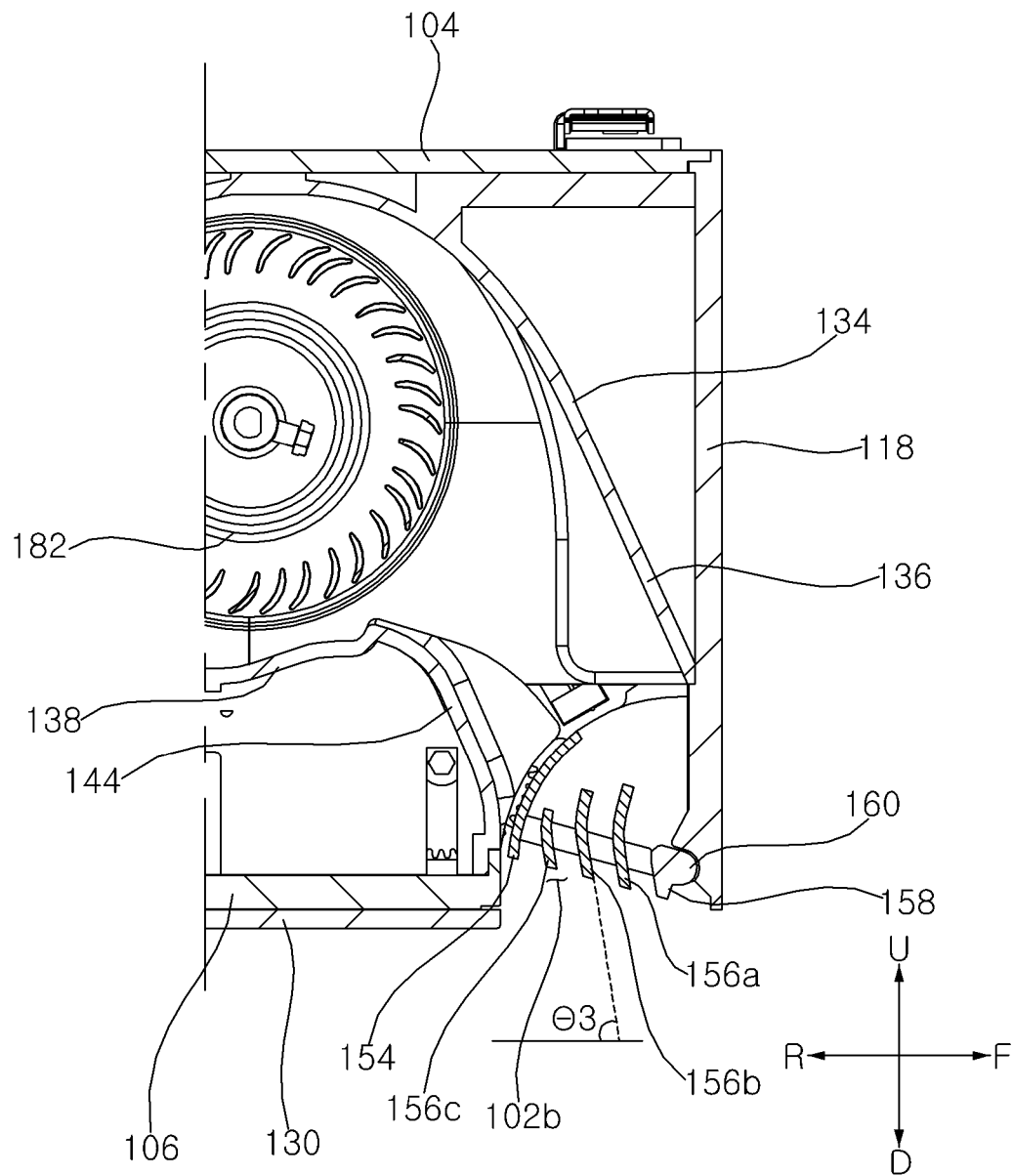
FIG. 18C is a cross-sectional view for explaining the orientation of the first louver in a third mode according to an embodiment.

Referring to FIGS. 18A to 18C, the first louver 150 may be switched to a first mode P1 for forming an oblique air current in the forward direction, a second mode P2 for forming a horizontal air current in the forward direction, and a third mode P3 for forming a vertical air current toward the floor. Referring to FIG. 18A, the first louver 150 may be disposed above the first bottom cover 130 in the first mode P1. In the first mode P1, the lower end of each of the vanes 154, 156, and 158 of the first louver 150 may be disposed above the first bottom cover 130 in the vertical direction.

In the first mode P1, the lower end of the outer vane 154 may be oriented in a direction perpendicular to the floor. In the first mode P1, the lower end of each of the inner vanes 156*a*, 156*b*, and 156*c* may be inclined in the forward direction.

Referring to FIG. 18B, a portion of the first louver 150 may be disposed below the first bottom cover 130 in the second mode P2. In the second mode P2, the lower end of the outer vane 154 and the lower end of each of the inner vanes 156*a*, 156*b*, and 156*c* may be disposed below the first bottom cover 130 in the vertical direction.

In the second mode P2, an inclination angle 82 formed by the lower inner vane portion 156*a*1, 156*b*1, 156*c*1 of each of the inner vanes 156*a*, 156*b*, and 156*c* and the floor may be set to 30 degrees or less. Accordingly, in the second mode P2, the air flowing through the first louver 150 may be discharged in a direction substantially parallel to the floor.

Referring to FIG. 18C, the first louver 150 may be disposed above the first bottom cover 130 in the third mode P3. In the third mode P3, the lower end of the outer vane 154 and the lower end of each of the inner vanes 156*a*, 156*b*, and 156*c* may be disposed above the first bottom cover 130 in the vertical direction.

In the third mode P3, an inclination angle 83 formed by the lower inner vane portion 156*a*1, 156*b*1, 156*c*1 of each of the inner vanes 156*a*, 156*b*, and 156*c* and the floor may be set to a range from 60 degrees to 90 degrees. Accordingly, in the third mode P3, the air flowing through the first louver 150 may be discharged in a direction substantially perpendicular to the floor.

Hereinafter, a second air-processing apparatus according to an embodiment will be described with reference to FIGS. 19 to 35C.

Figure 19:
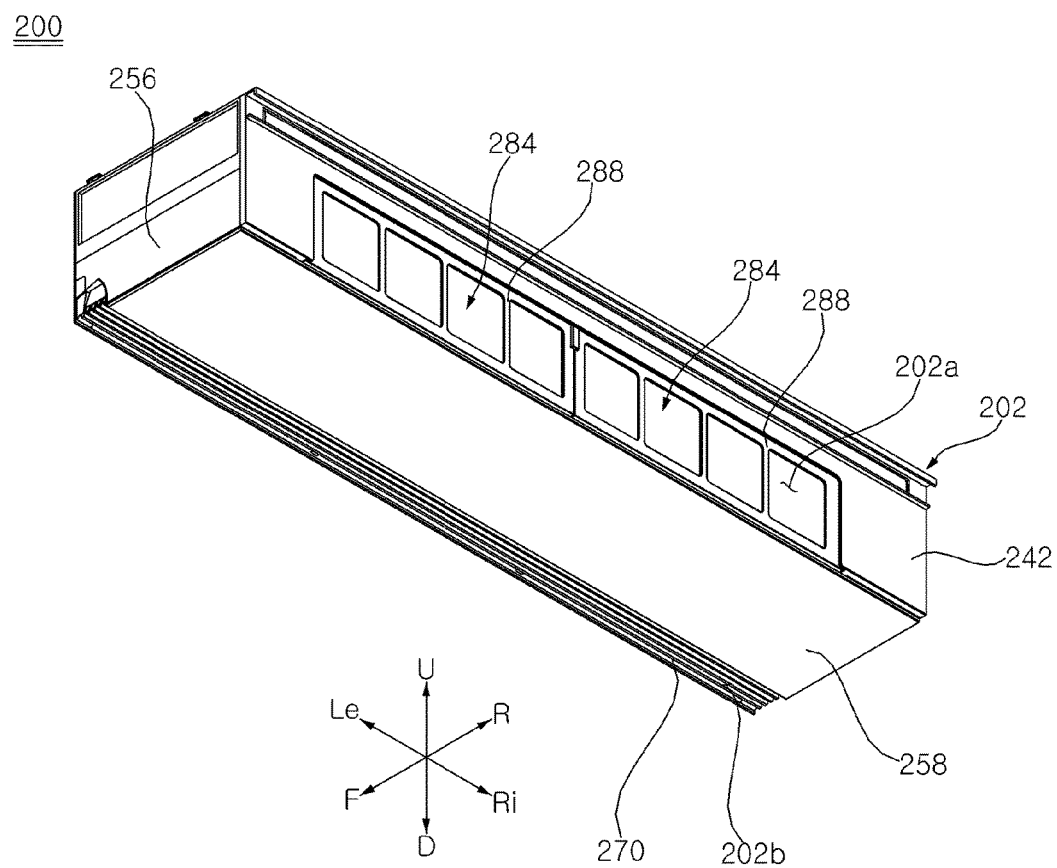
FIG. 19 is a perspective view of a second air-processing apparatus according to an embodiment.

The second air-processing apparatus 200 induces air to flow through a filter device 284 and discharges the air to the outside. The second air-processing apparatus 200 may include a second inlet 202*a* formed in one or a first side thereof in order to suction air thereinto and a second outlet 202*b* formed in another or a second side thereof perpendicular to the second inlet 202*a* in order to discharge air therefrom. Referring to FIG. 19, the second inlet 202*a* may be formed so as to extend perpendicular to a surface of a floor or ceiling. The second outlet 202*b* may be formed so as to be open downwards. The second outlet 202*b* may extend perpendicular to the second inlet 202*a*.

Figure 20:
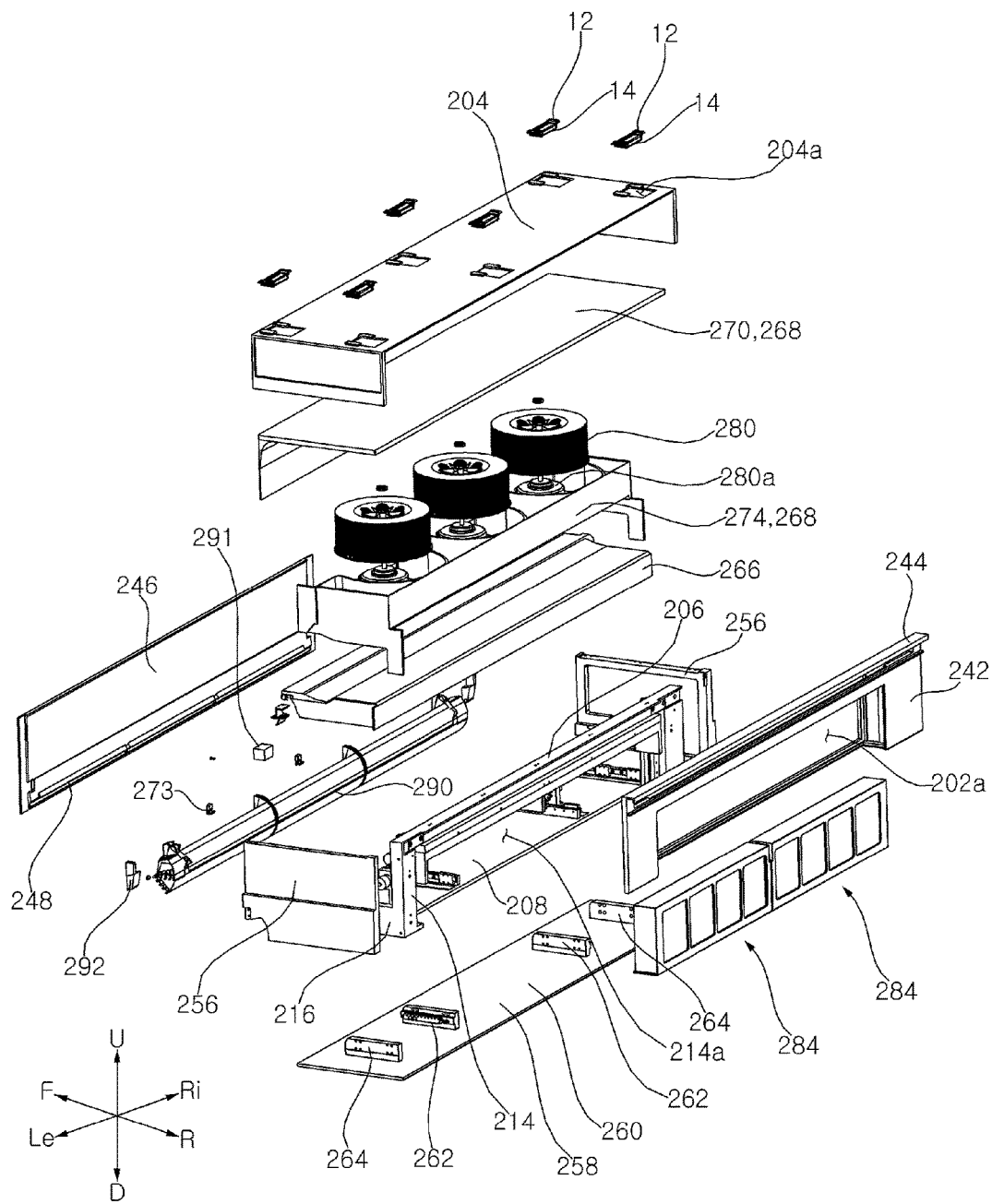
FIG. 20 is an exploded perspective view of the second air-processing apparatus of FIG. 19.
Figure 21:
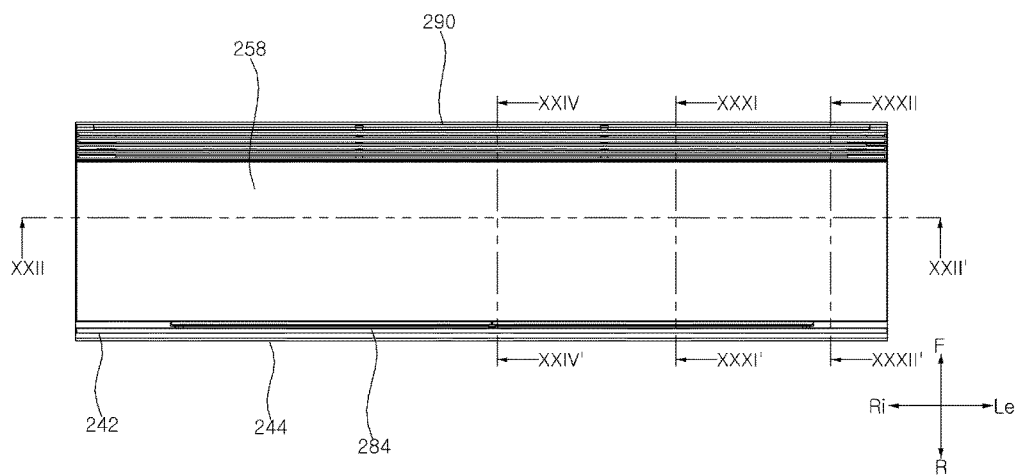
FIG. 21 is a bottom view of the second air-processing apparatus of FIG. 19.
Figure 22:
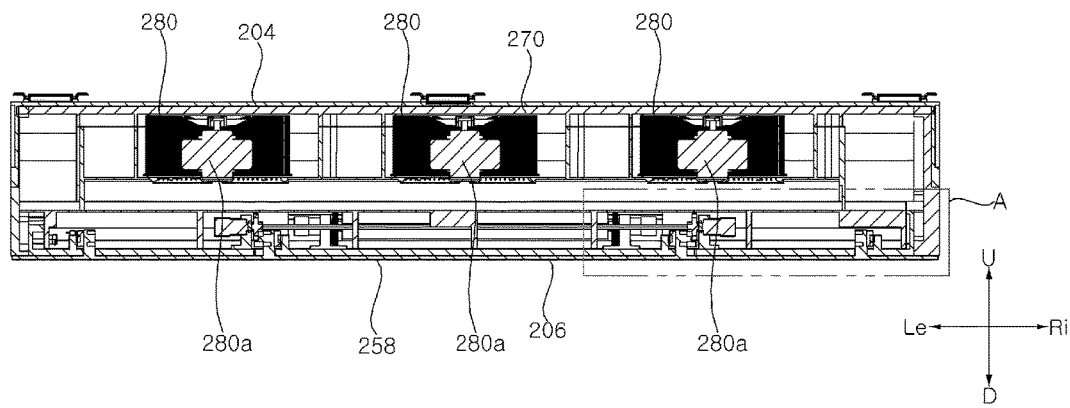
FIG. 22 is a cross-sectional view, taken along line XXII-XXII' in FIG. 21.

Referring to FIG. 20, the second air-processing apparatus 200 may include a second fan 280, which causes air to flow, and a second fan motor 280*a*, which rotates the second fan 280. According to this embodiment, a plurality of second fans 280 may be provided, and a plurality of second fan motors 280*a* may be provided such that each of the second fan motors 280*a* is connected to a respective one of the plurality of second fans 280.

The second air-processing apparatus 200 may include a second case 202, which forms an external appearance of the second air-processing apparatus 200, and a second housing 268, which is disposed inside of the second case 202 and which forms a flow path through which air flows. The second air-processing apparatus 200 may further include a second louver 290, which is rotatably disposed in the second case 202 in order to adjust a direction of air that is discharged from the second outlet 202*b*, and a second louver actuator 294, which changes an orientation of the second louver 290.

The second louver 290 and the second louver actuator 294 disposed in the second air-processing apparatus 200 may have the same structures and perform the same functions as the first louver 150 and the first louver actuator 174 of the first air-processing apparatus 100 described above with reference to FIGS. 12 to 17. Therefore, the description of the first louver 150 and the first louver actuator 174 of the first air-processing apparatus 100 may apply to the second louver 290 and the second louver actuator 294 disposed in the second air-processing apparatus 200.

The second air-processing apparatus 200 may include a second control box 291 that controls operation of the second fan motor 280*a* or operation of the second louver actuator 294.

Referring to FIG. 20, the second case 202 may include a second upper cover 204, which may be secured to a ceiling, a second lower cover 206, which is disposed below the second upper cover 204, second rear cover 242, which forms therein the second inlet 202*a* and to which the filter device 284 is mounted, a second front cover 246, which is disposed so as to be spaced forwards apart from the second rear cover 242, and two second side covers 256, which are disposed at both side ends of the second lower cover 206. The second case 202 may further include a second bottom cover 258, which is disposed below the second lower cover 206 so as to be movable in the forward-rearward direction.

Referring to FIG. 20, the second inlet 202*a* may be formed in the second rear cover 242. The guide rail 10 (refer to FIG. 3) may be mounted on an outer surface of the second rear cover 242. The second inlet 202*a*, in which the filter device 284 is mounted, may be formed in a lower portion of the second rear cover 242. The guide rail 10 and the second support rail 244 that guides movement of the filter cleaner 300 may be mounted on the second rear cover 242.

Figure 24:
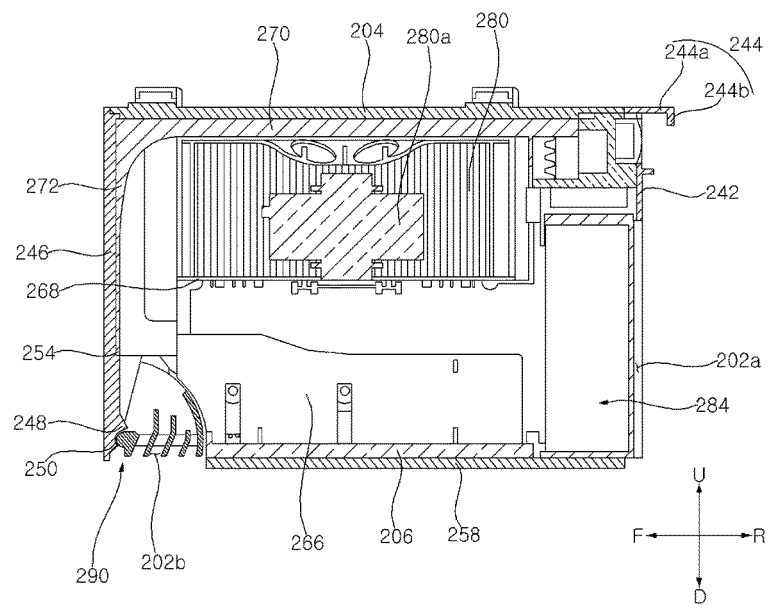
FIG. 24 is a cross-sectional view, taken along line XXIV-XXIV' in FIG. 21.

The guide rail 10 may be disposed above the second inlet 202*a*. Referring to FIG. 24, the second support rail 244 may be disposed at an upper end of the second rear cover 242.

The second support rail 244 may include a second top plate 244*a*, which protrudes rearwards from an upper end of the second rear cover 242, and a second bent portion 244*b*, which is bent and extends downwards from a rear end of the second top plate 244*a*. The top roller 326 of the filter cleaner 300 may be in contact with the second bent portion 244*b*.

The second rear cover 242 may be disposed behind a second vertical plate 214 of the second lower cover 206, which will be described hereinafter. The second rear cover 242 may be fixedly disposed behind the second vertical plate 214.

A filter-mounting part or portion or filter mount 234 (refer to FIG. 31) that moves the filter device 284 in the upward-downward direction may be disposed in the second inlet 202*a* in the second rear cover 242. The filter-mounting portion 234 may be moved in the upward-downward direction by a filter-drive device 228, which will be described hereinafter.

Referring to FIG. 20, the second upper cover 204 may include a second fixing recess 204*a* formed in an upper surface thereof, into which fixing member 12 that fixes the second case 202 to the ceiling may be inserted. The second fixing recess 204*a* formed in the second upper cover 204 may have a same shape as the first fixing recess 104*a* formed in the first upper cover 104. Accordingly, the second upper cover 204 may be fixed to mounting member 14 mounted to the ceiling by the fixing member 12 disposed at an upper side of the first upper cover 104.

Referring to FIG. 20, the second upper cover 204 may include two side plates 266*d*, which are bent and extend downwards from both side ends thereof. Each of the two side plates 266*d* may be connected to a respective one of the two second side covers 256.

Figure 23:
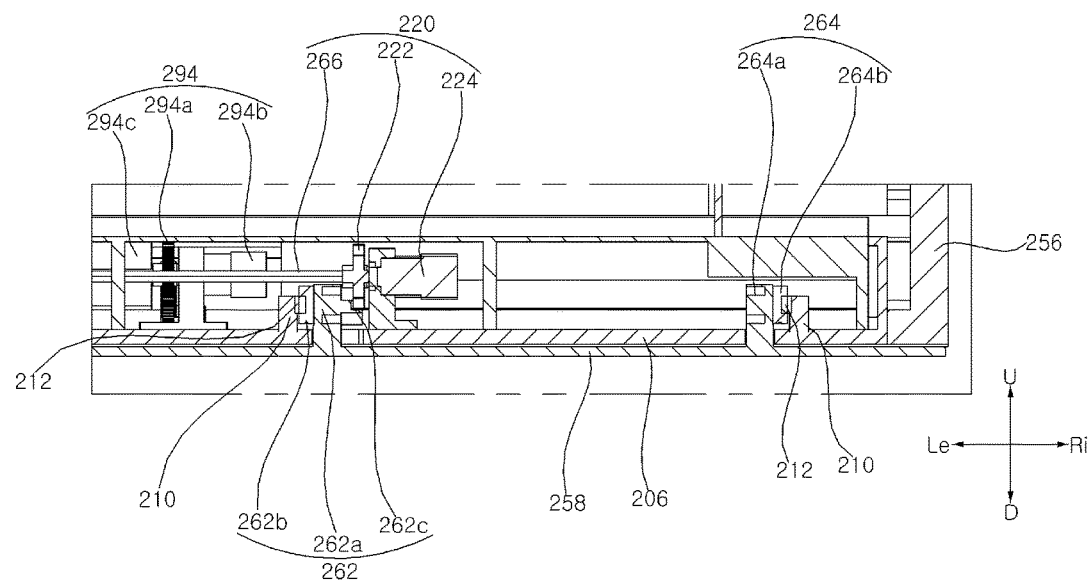
FIG. 23 is an enlarged view of portion A in FIG. 22.

Referring to FIG. 23, the second lower cover 206 may be disposed below the second housing 268. The second louver actuator 294 may be disposed on the second lower cover 206. A cover-drive device 220 that moves the second bottom cover 258 in the forward-rearward direction may be disposed on the second lower cover 206. The filter-drive device 228 that moves the filter device 284 and the filter-mount 234 in the upward-downward direction may be disposed on the second lower cover 206.

The second lower cover 206 may include a second horizontal plate 208, which is disposed above the second bottom cover 258, a second vertical plate 214, which is disposed at a rear side of the second horizontal plate 208 so as to be perpendicular thereto and in which a second inner suction hole 214a is formed, and two second side walls 216, which are bent and extend upwards from both side ends of the second horizontal plate 208.

Figure 33A:
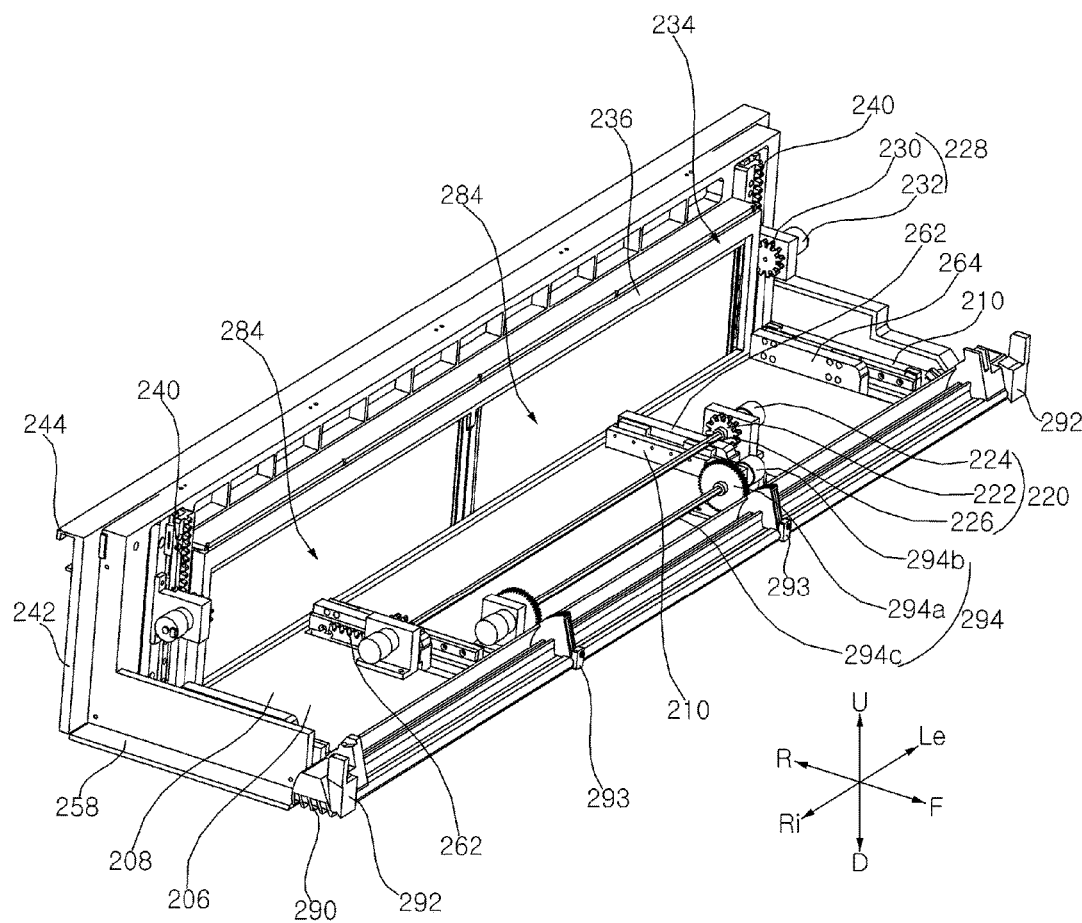
FIG. 33A is a perspective view for explaining an arrangement of a second bottom cover, the filter-mount, and the filter device in a state in which the second bottom cover is located at a rear position.

Referring to FIG. 33A, the second louver actuator 294 is disposed on the second horizontal plate 208. The cover-drive device 220 is disposed above the second horizontal plate 208. The second horizontal plate 208 has guide grooves 208a formed therein to allow cover guides 262 and 264 of the second bottom cover 258 to be inserted thereinto.

Figure 31:
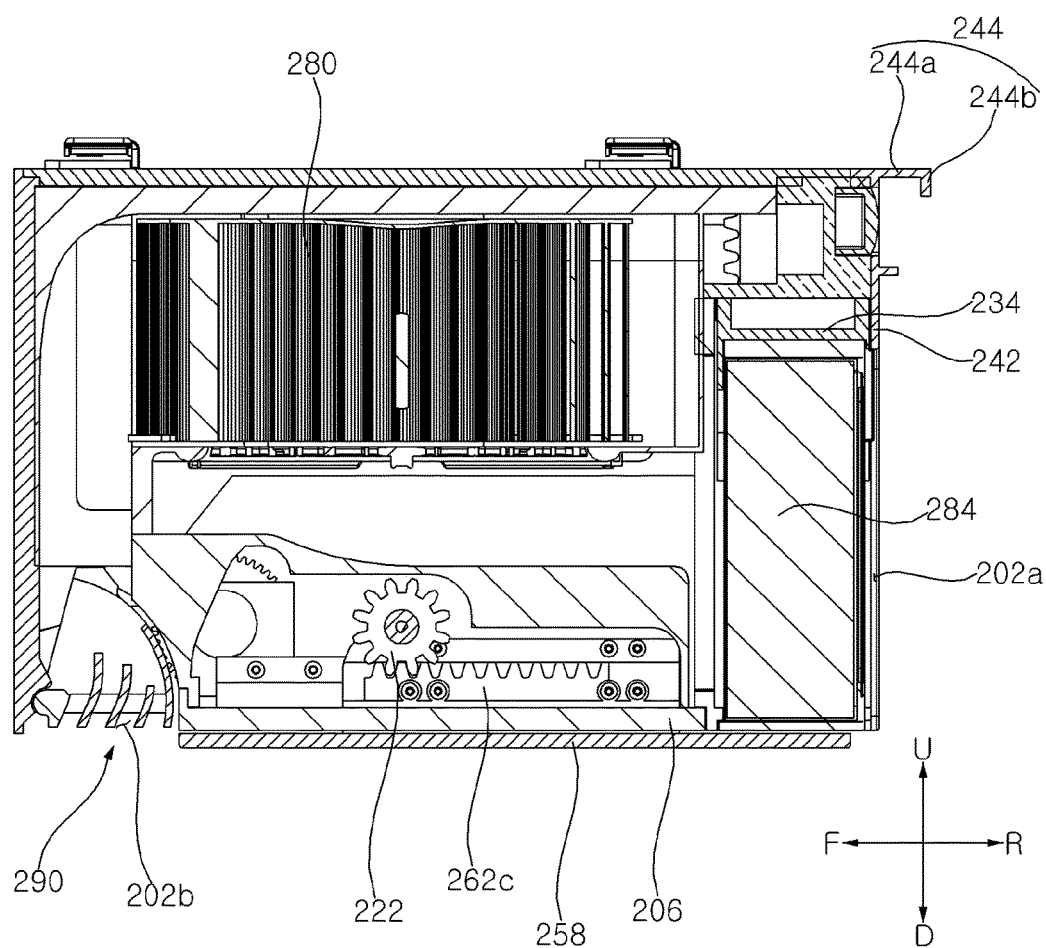
FIG. 31 is a cross-sectional view, taken along line XXXI-XXXI' in FIG. 21.

Referring to FIGS. 31 and 33A, the cover-drive device 220 may include a cover-drive gear 222, which meshes with a guide gear 262c of the first cover guide 262, which will be described hereinafter, so as to rotate together therewith, and a cover-drive motor 224 that rotates the cover-drive gear 222.

According to this embodiment, two cover-drive gears 222 may be provided so as to be spaced apart from each other in the lateral direction. The cover-drive device 220 may include a cover-drive shaft 226 that interconnects the two cover-drive gears 222 spaced apart from each other. Accordingly, the two cover-drive gears 222 connected to both ends of the cover-drive shaft 226 may rotate identically.

Referring to FIG. 33A, the second horizontal plate 208 may be provided with fixing guides 210, which may be connected to the cover guides 262 and 264 of the second bottom cover 258 in order to prevent the second bottom cover 258 from moving in the upward-downward direction. The fixing guides 210 may protrude upwards from the second horizontal plate 208, and extend in the forward-rearward direction.

Referring to FIG. 33A, the fixing guides 210 may be disposed so as to be in contact with the first cover guide 262 or the second cover guide 264, which will be described hereinafter. The fixing guides 210 support movement of the second bottom cover 258 in the forward-rearward direction. The fixing guides 210 may also prevent the second bottom cover 258 from moving in the upward-downward direction.

Referring to FIG. 23, the fixing guides 210 may have fixing protrusions 212, which protrude toward the cover guides 262 and 264. The fixing protrusions 212 extend in the forward-rearward direction. The fixing protrusions 212 may be disposed so as to be in contact with a first guide protrusion 262b of the first cover guide 262 or a second guide protrusion 264b of the second cover guide 264.

The fixing protrusions 212 have a structure corresponding to the first guide protrusion 262b of the first cover guide 262 or the second guide protrusion 264b of the second cover guide 264, thereby preventing the second bottom cover 258 from moving in the upward-downward direction.

Referring to FIG. 20, the second vertical plate 214 may have a second inner suction hole 214a formed therein. The second inner suction hole 214a may have a size corresponding to the second inlet 202a. The filter-drive device 228 may be disposed on the second vertical plate 214.

Each of the two second side covers 256 may be connected at a lower portion thereof to the second lower cover 206, and be connected at an upper portion thereof to the second upper cover 204. A second rotational support rod 292 that supports rotation of the second louver 290 may be disposed on each of the two second side covers 256. The second rotational support rod 292, which is connected to each of the second side covers 256, may have a same shape as the first rotational support rod 168 connected to each of the first side covers 128.

The second front cover 246 may be disposed in front of the second housing 268. The second front cover 246 may have a same shape as the first front cover 118. Also, the second front cover 246 may be disposed in the same manner as the first front cover 118. Therefore, a lower end of the second front cover 246 may be spaced a predetermined gap apart from a front end portion of the second lower cover 206, thereby forming the second outlet 202b.

In addition, a second louver protrusion 248, in which a second louver groove 250 that receives a second louver rotational shaft 270a of the second louver 290 may be formed, may be formed on the second front cover 246 in order to limit a range within which the second louver 290 may rotate. A second support-rod recess 252, in which a second auxiliary support rod 293 may be disposed, may be formed between a left or first lateral end and a right or second lateral end of the second louver protrusion 248.

Referring to FIG. 24, a second stepped portion or step 254, which interferes with an end portion of a second upper housing 270 described hereinafter, may be formed in the second front cover 246.

Figure 33B:
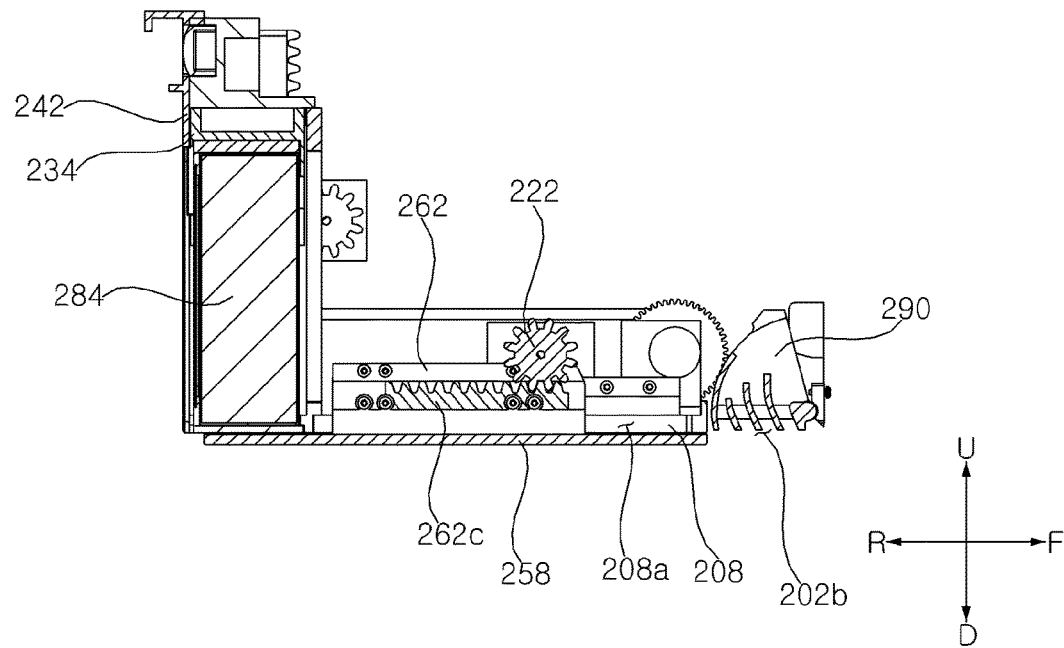
FIG. 33B is a cross-sectional view of the arrangement of FIG. 33A.

The second bottom cover 258 may be disposed at the second lower cover 206 so as to be movable in the forward-rearward direction. Referring to FIG. 33B, when the second bottom cover 258 is disposed at a rear position adjacent to the second rear cover 242, the second bottom cover 258 may cover a lower side of the filter device 284. Referring to FIG. 34B, when the second bottom cover 258 is disposed at a front position adjacent to the second front cover 246, the second bottom cover 258 may block the second outlet 202b. Referring to FIG. 34B, when the second bottom cover 258 is disposed at a front position adjacent to the second front cover 246, the second bottom cover 258 may open the lower side of the filter device 284.

Referring to FIG. 20, the second bottom cover 258 may include a bottom plate 260, which may be disposed below the second lower cover 206, and cover guides 262 and 264, which protrude upwards from the bottom plate 260 and which move the bottom plate 260 in the forward-rearward direction. Referring to FIG. 23, the cover guides 262 and 264 may include first cover guide 262, which may be connected to the cover-drive device 220 to move the bottom plate 260, and a second cover guide 264, which prevents the bottom plate 260 from vibrating in the upward-downward direction.

Referring to FIG. 23, the first cover guide 262 may include a first guide wall 262a, which protrudes upwards from the bottom plate 260 and extends in the forward-rearward direction, a guide gear 262c, which is disposed on one or a first side of the first guide wall 262a and is screwed to the cover-drive device 220, and a first guide protrusion 262b, which is disposed on the opposite or a second side of the first guide wall 262a and guides movement of the second bottom cover 258 in the forward-rearward direction. A recess 262b1, into which the fixing protrusion 212 may be inserted, may be formed in the first guide protrusion 262b.

Referring to FIG. 23, the second cover guide 264 may include a second guide wall 264a, which protrudes upwards from the bottom plate 260 and extends in the forward-rearward direction, and a second guide protrusion 264b, which is disposed on one side of the second guide wall 264a and guides movement of the second bottom cover 258 in the forward-rearward direction. A recess 264b1, into which the fixing protrusion 212 may be inserted, may be formed in the second guide protrusion 264b.

Referring to FIG. 20, the second air-processing apparatus 200 may include an inner cover 266, which may be disposed above the second lower cover 206 and cover upper sides of the second louver actuator 294 and the cover-drive device 220. Referring to FIG. 24, the inner cover 266 may guide a flow of air flowing inside of the second case 202, and may prevent the air from flowing to the second louver actuator 294. The inner cover 266 may be coupled to the second lower cover 206 to form a space in which the second louver actuator 294 and the cover-drive device 220 are disposed.

Figure 25A:
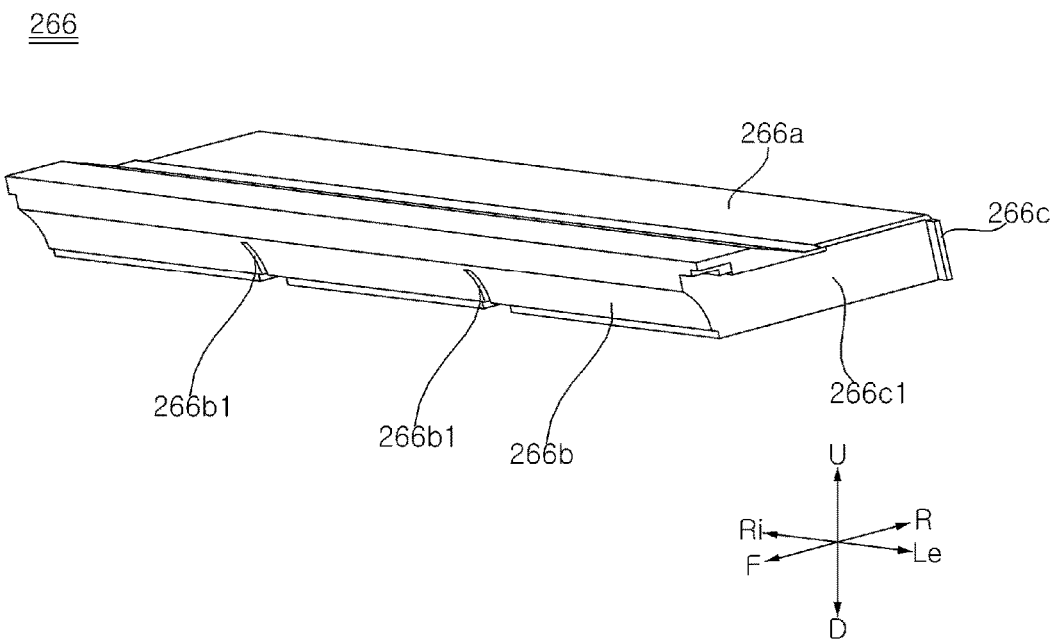
FIG. 25A is a perspective view of an inner cover according to an embodiment.
Figure 25B:
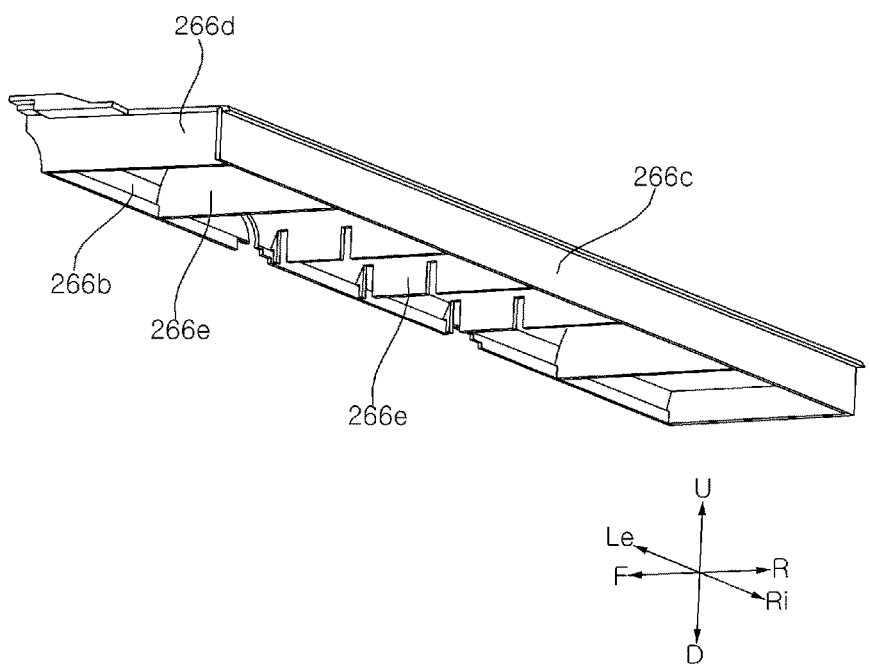
FIG. 25B is a perspective view of the inner cover when viewed from a direction different from that of FIG. 25A.

Referring to FIGS. 25A and 25B, the inner cover 266 may include an upper plate 266a, which may be disposed above the second louver actuator 294, a front plate 266b, which covers a front side of the second louver actuator 294, a rear plate 266c, which covers a rear side of the second louver actuator 294, and side plates 266d, which cover the lateral sides of the second louver actuator 294.

The rear plate 266c may prevent the air flowing through the filter device 284 from flowing to the space under the inner cover 266. The upper plate 266a may guide the air flowing through the filter device 284 to the space in which the second fan 280 is disposed. The front plate 266b may guide the air flowing through the second fan 280 toward the second outlet 202b. The front plate 266b may have a second gear hole 266b1 formed in a region in which a second louver gear 294a of the second louver actuator 294 is disposed. A portion of the second louver gear 294a may protrude outside of the second gear hole 266b1 (refer to FIG. 25A), and may be in contact with the second louver 290.

Referring to FIG. 25B, the inner cover 266 may include a plurality of partition walls 266e, which vertically extend downwards from the upper plate 266a. The plurality of partition walls 266e may be spaced apart from each other in the lateral direction, and may increase a rigidity of the inner cover 266.

Referring to FIG. 24, the second housing 268 may be disposed inside of the second case 202 to form a space in which air flows. A second fan 280 and a second fan motor 280a that rotates the second fan 280 may be disposed inside of the second housing 268.

The second fan 280 may be implemented as, for example, a centrifugal fan, which suctions air in a direction parallel to a rotational axis and discharges air in a centrifugal direction. Accordingly, referring to FIG. 24, the second fan motor 280a may be disposed inside of the second fan 280 to rotate the second fan 280.

The second fan motor 280a may be fixed to second upper housing 270, which will be described hereinafter. Referring to FIG. 24, the second housing 268 may include a second upper housing 270, which is disposed above the second fan 280, and a second lower housing 274, which is disposed below the second fan 280.

Figure 26A:
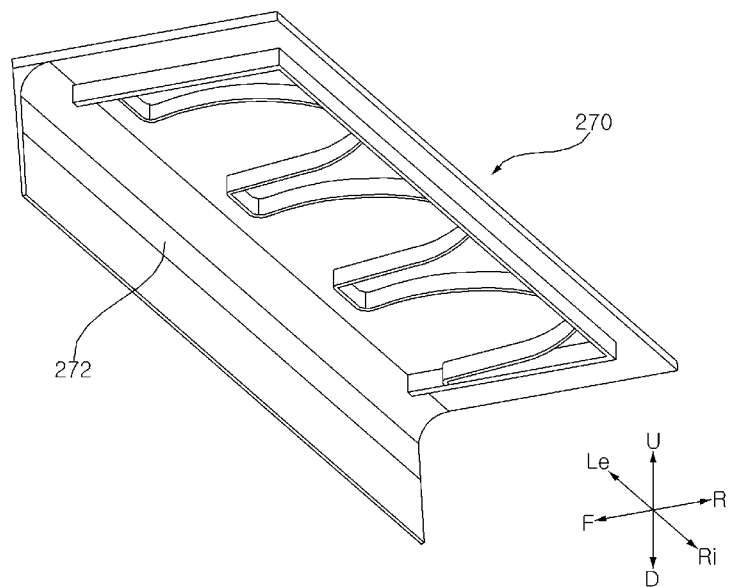
FIG. 26A is a perspective view of a second upper housing according to an embodiment.
Figure 26B:
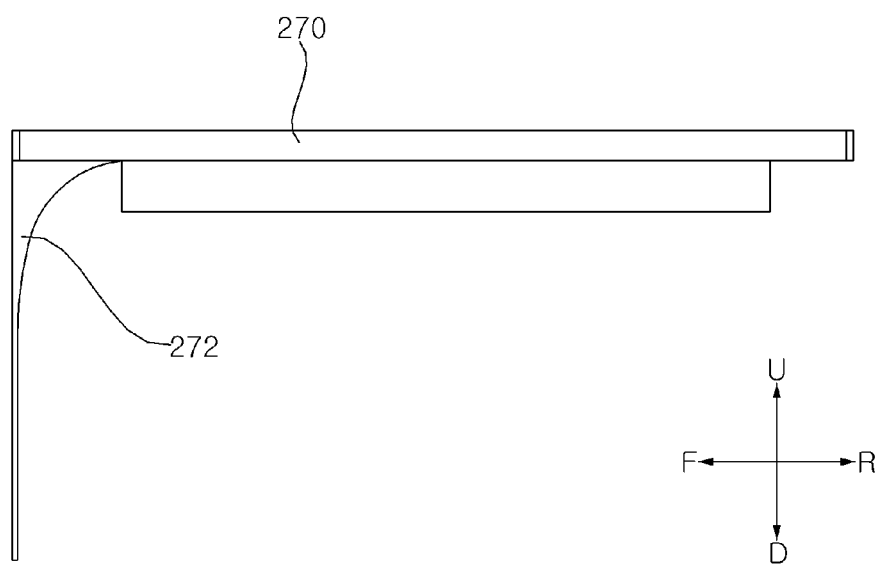
FIG. 26B is a side view of the second upper housing of FIG. 26A.

Referring to FIGS. 26A and 26B, the second upper housing 270 may be mounted to the second upper cover 204. A lower end of the second upper housing 270 may be disposed on the second stepped portion 254 of the second front cover 246. The second upper housing 270 may include a front guide 272 that guides the air flowing through the second fan 280 to the second outlet 202b. The front guide 272 may extend downwards from a front end of the second upper housing 270.

Referring to FIG. 24, the front guide 272 causes the air flowing along the second fan 280 to flow downwards. The front guide 272 guides the air flowing through the second fan 280 to the second outlet 202b.

The front guide 272 may be disposed so as to be smoothly connected to the second front cover 246. Accordingly, the air flowing along the front guide 272 may flow to the second outlet 202b via the second front cover 246.

Figure 27:
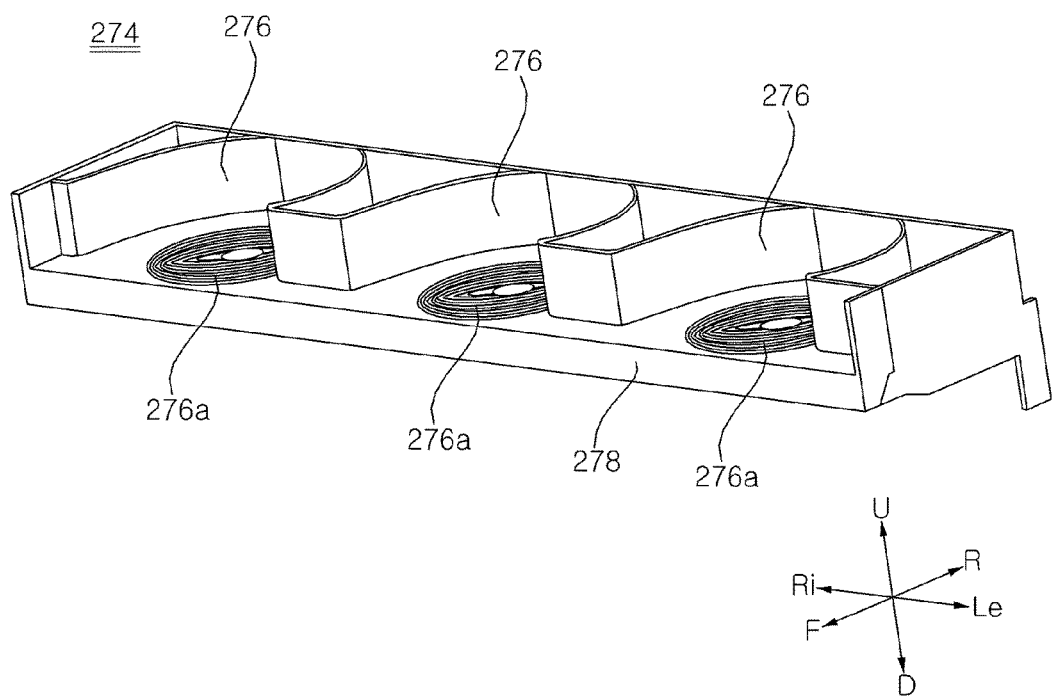
FIG. 27 is a perspective view of a second lower housing according to an embodiment.

Referring to FIG. 24, the second fan motor 280a may be mounted in the second upper housing 270. Referring to FIG. 24, the second lower housing 274 may be disposed above the inner cover 266. Referring to FIG. 27, the second lower housing 274 may include a plurality of fan housings 276 that forms spaces in which a plurality of second fans 280 may be disposed. Each of the fan housings 276 may be spaced apart from an outer circumferential surface of the second fan 280 in the radial direction. Each of the fan housings 276 may have an open front portion. Accordingly, the air flowing in the radial direction of the second fan 280 may be discharged to the open front portion of each of the fan housings 276. A fan inlet 276a, through which air is introduced into the second fan 280, may be formed below each of the fan housings 276.

The second lower housing 274 may be spaced upwards apart from the inner cover 266. Accordingly, a suction flow path 268a, through which the air passing through the filter device 284 flows, may be formed between the second lower housing 274 and the inner cover 266.

The second lower housing 274 may be spaced rearwards apart from the front guide 272 of the second upper housing 270. The second lower housing 274 may include a rear guide 278, which may be spaced apart from the front guide 272 and extends downwards. The second lower housing 274 may be spaced upwards apart from the inner cover 266 by the rear guide 278. The rear guide 278 forms a second discharge flow path 268b in the upward-downward direction together with the front guide 272. The front guide 272 and the rear guide 278 may guide the air flowing from the second fan 180 to the second outlet 202b.

The filter device 284 may be mounted to the filter-mount 234. The filter-mount 234 may be movably disposed in the second case 202. The filter device 284 and the filter-mount 234 may be coupled to each other by means of a first magnet 287 disposed in the filter device 284 and a second magnet 238 disposed in the filter-mount 234. Accordingly, a position of the filter device 284 may be changed in the upward-downward direction according to movement of the filter-mount 234. Also, a user may easily separate the filter device 284 from the filter-mount 234.

Figure 28:
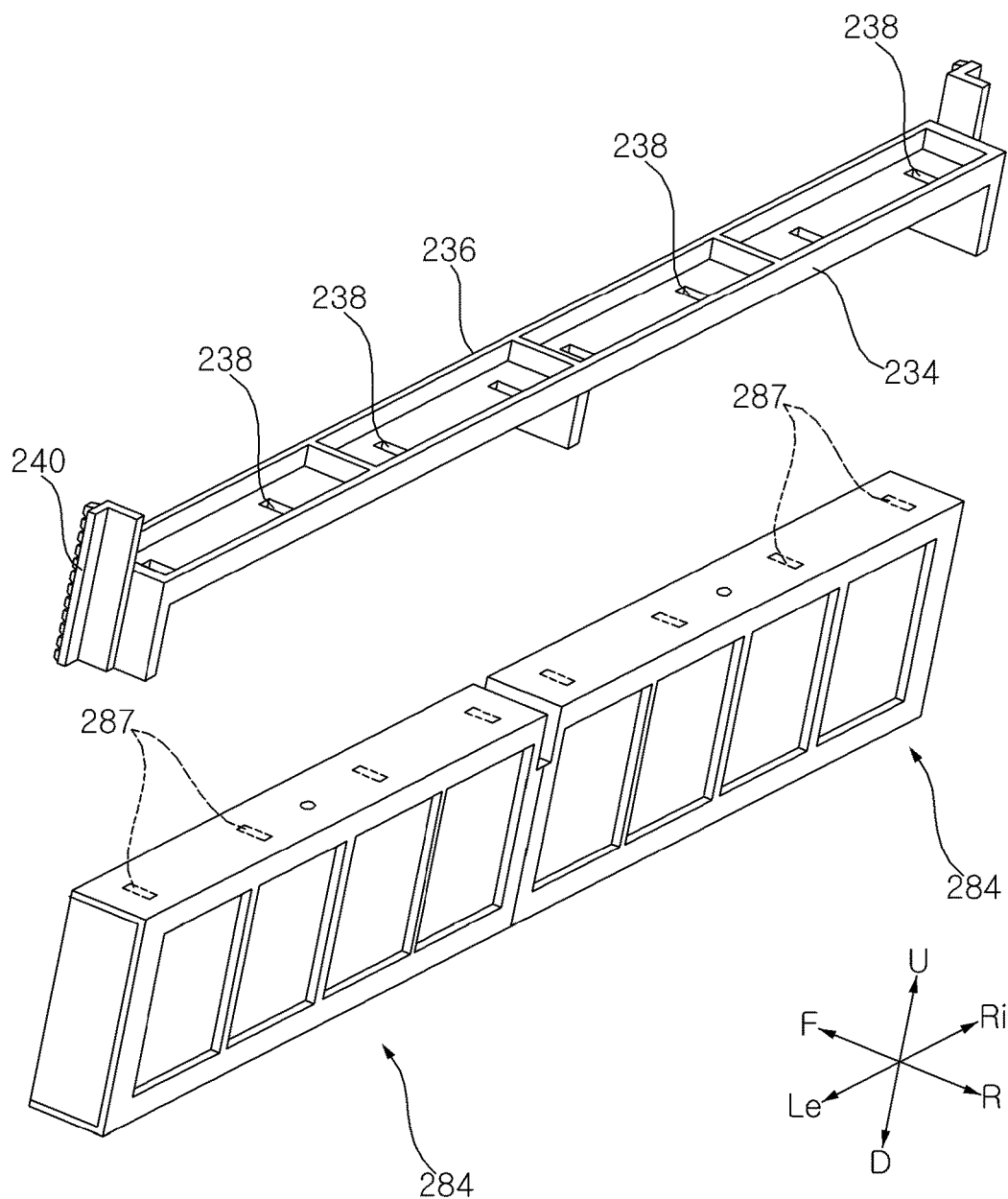
FIG. 28 is an exploded perspective view of a filter-mount and a filter device according to an embodiment.
Figure 29:
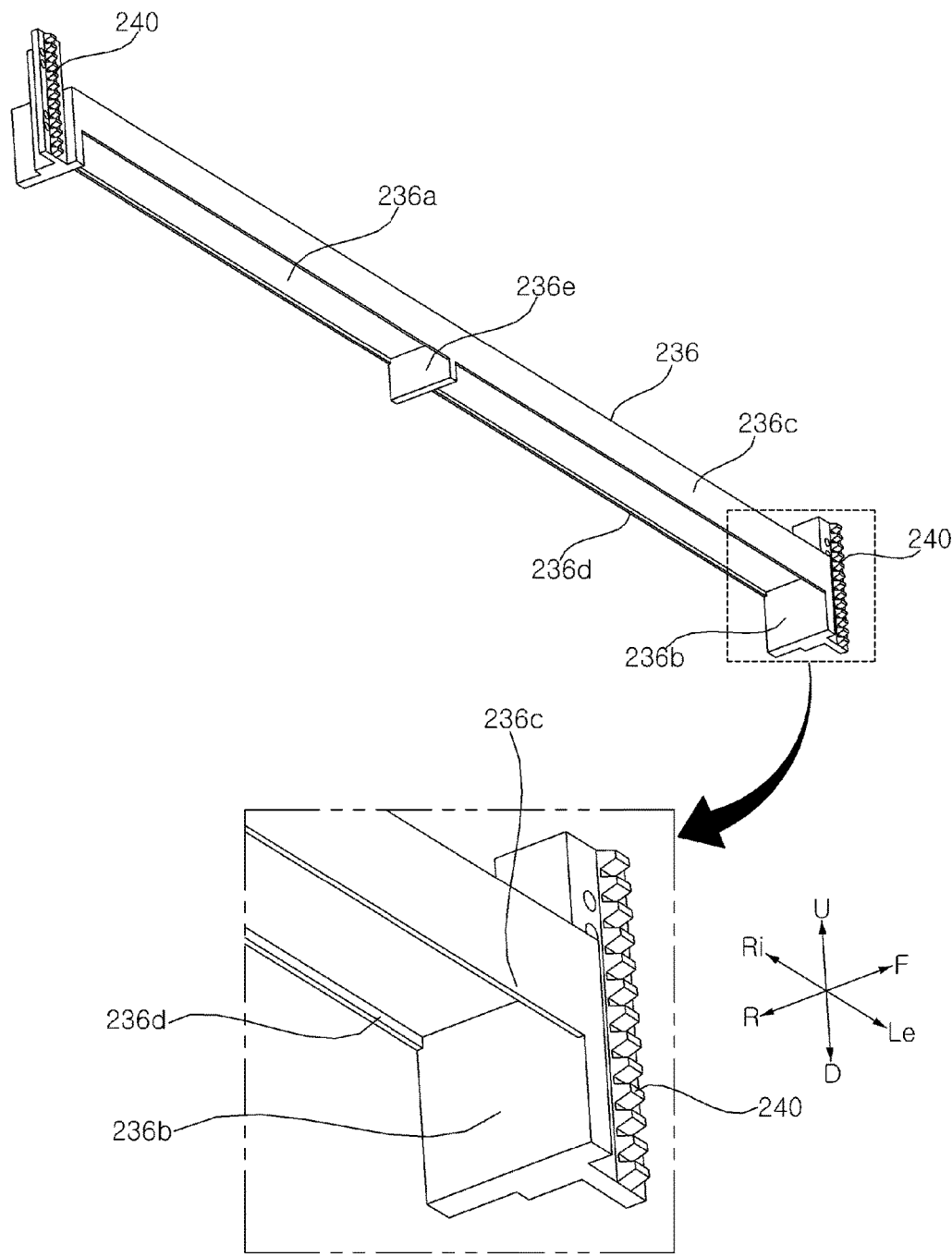
FIG. 29 is a bottom perspective view of a filter-mount according to an embodiment.

Referring to FIGS. 28 and 29, the filter-mount 234 may include a mounting body 236, to which the filter device 284 may be mounted, and a body gear 240 that adjusts a position of the mounting body 236.

Referring to FIGS. 28 and 29, the mounting body 236 may include an upper body 236a, which is disposed above the filter device 284, side bodies 236b, which extend downwards from both ends of the upper body 236a, a front body 236c, which extends downwards from the front end of the upper body 236a, and a rear body 236d, which extends downwards from the rear end of the upper body 236a. The side bodies 236b may extend downwards to be longer than the front body 236c or the rear body 236d. Two side bodies 236 may be provided at respective ends of the upper body 236a. A partition body 236e that isolates a plurality of filter devices 284 from each other may be disposed between the two side bodies 236b. A length that the front body 236c extends downwards from the upper body 236a may be longer than a length that the rear body 236d extends downwards from the upper body 236a. The front body 236c, the rear body 236d, and the side bodies 236b may guide mounting of the filter device 284 to the filter-mount 234.

A body gear 240 may be disposed outside of the side body 236b. The body gear 240 may be a rack gear in which threads protruding forwards extend in the upward-downward direction.

A plurality of second magnets 238 may be disposed above the upper body 236a.

Figure 30:
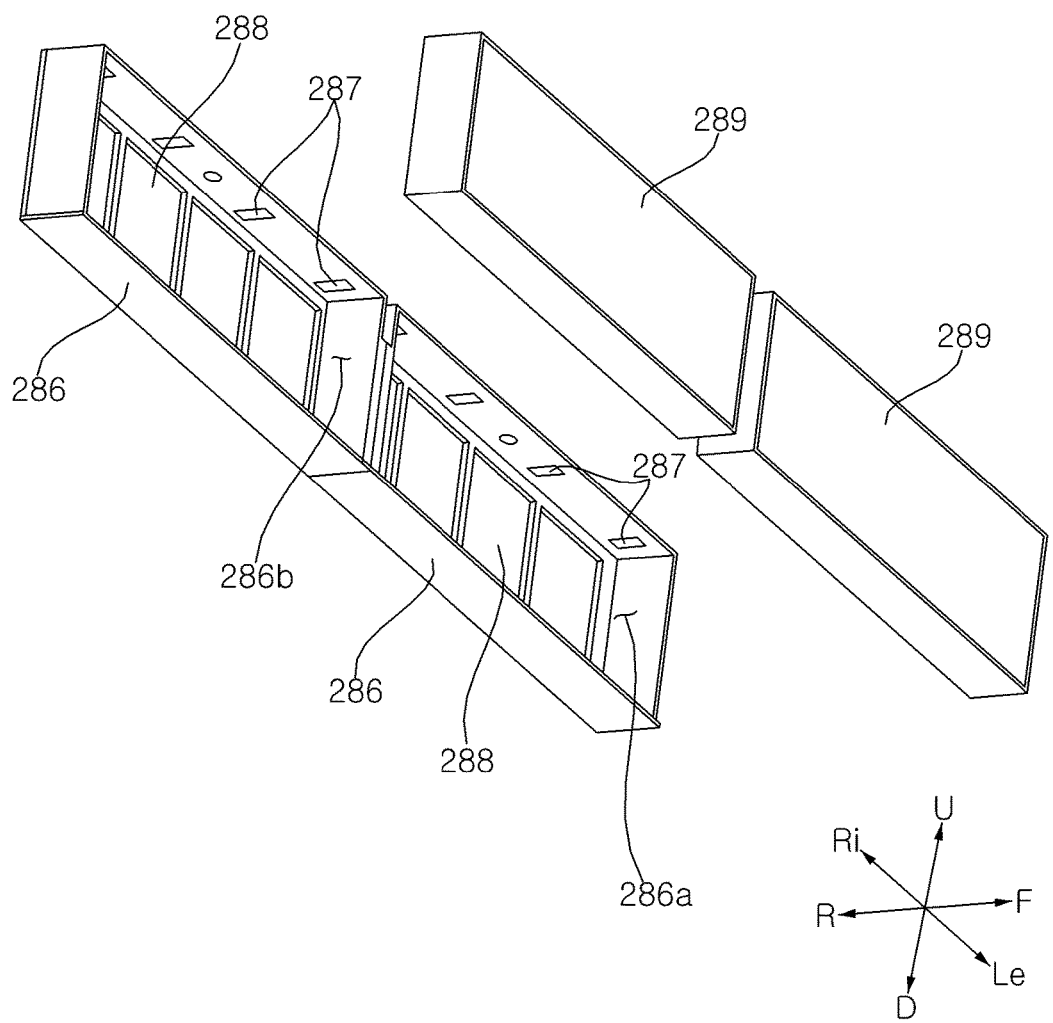
FIG. 30 is an exploded perspective view of a filter device according to an embodiment.

Referring to FIG. 30, the filter device 284 may include a filter case 286, which supports a second pre-filter 288 disposed in one side thereof and has an open opposite side, and a HEPA filter 289, which is disposed so as to be inserted into or withdrawn out of the filter case 286 and functions to remove fine dust. The filter case 286 may have a size capable of accommodating the HEPA filter 289. The second pre-filter 288 that primarily removes foreign substances from the air introduced into the second inlet 202a may be disposed in one side of the filter case 286. The filter case 286 may have an opening 286a formed in a surface thereof opposite the second pre-filter 288. The HEPA filter 289 may be inserted into or withdrawn out of the filter case 286 through the opening 286a.

The first magnet 287 may be disposed on an upper wall of the filter case 286. The first magnet 287 may be disposed at a position corresponding to the second magnet 238 when the filter device 284 is mounted to the filter-mount 234.

Referring to FIG. 33A, the filter-drive device 228 may be disposed on the second lower cover 206, and move the filter-mount 234 in the upward-downward direction. The filter-drive device 228 may be disposed on the second vertical plate 214. The filter-drive device 228 may be disposed at each of both side ends of the second vertical plate 214.

Figure 32:
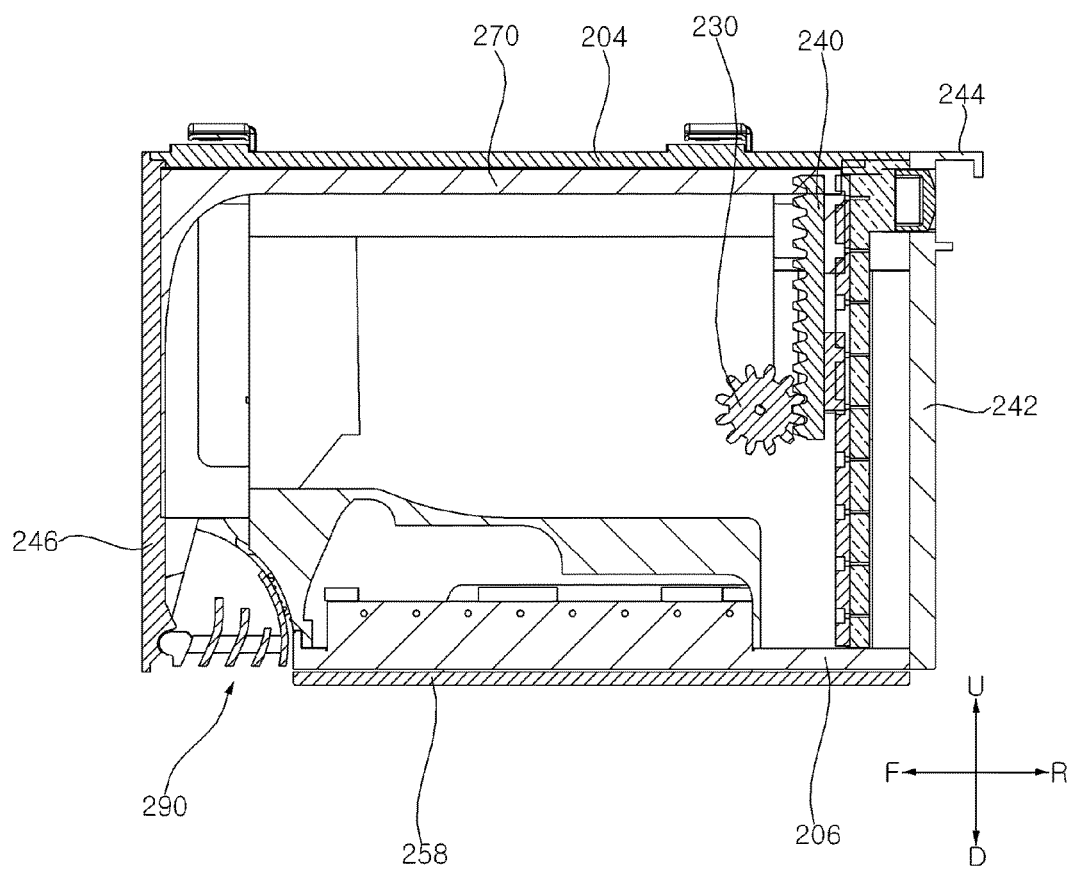
FIG. 32 is a cross-sectional view, taken along line XXXII-XXXII' in FIG. 21.

Referring to FIGS. 32 and 33A, the filter-drive device 228 may include a filter-drive gear 230, which meshes with the body gear 240 and rotates together therewith, and a filter-drive motor 232, which rotates the filter-drive gear 230. The filter-drive gear 230 may be implemented as, for example, a spur gear. The filter-drive gear 230 and the filter-drive motor 232 may be fixedly disposed on the second vertical plate 214.

The second air-processing apparatus 200 may include second louver 250, which is rotatably disposed in the second outlet 202b in order to adjust a direction of air that is discharged from the second outlet 202b, and a second louver actuator 294, which adjusts an orientation of the second louver 290.

The second louver 290 and the second louver actuator 294 may have the same structures and perform the same functions as the first louver 150 and the first louver actuator 174 of the first air-processing apparatus 100 described above. Therefore, the description of the first louver 150 and the first louver actuator 174 of the first air-processing apparatus 100 may apply to the second louver 290 and the second louver actuator 294.

Hereinafter, movement of the second bottom cover 258, the filter-mount 234, and the filter device 284 will be described with reference to FIGS. 33A to 35C.

Referring to FIGS. 33A and 33B, the second bottom cover 258 is disposed below the filter device 284. Accordingly, a lower side of the second louver 270 may be opened, and thus, the orientation of the second louver 270 may be changed. The filter device 284 and the filter-mount 234 that moves the filter device 284 are disposed above the second bottom cover 258.

Figure 34A:
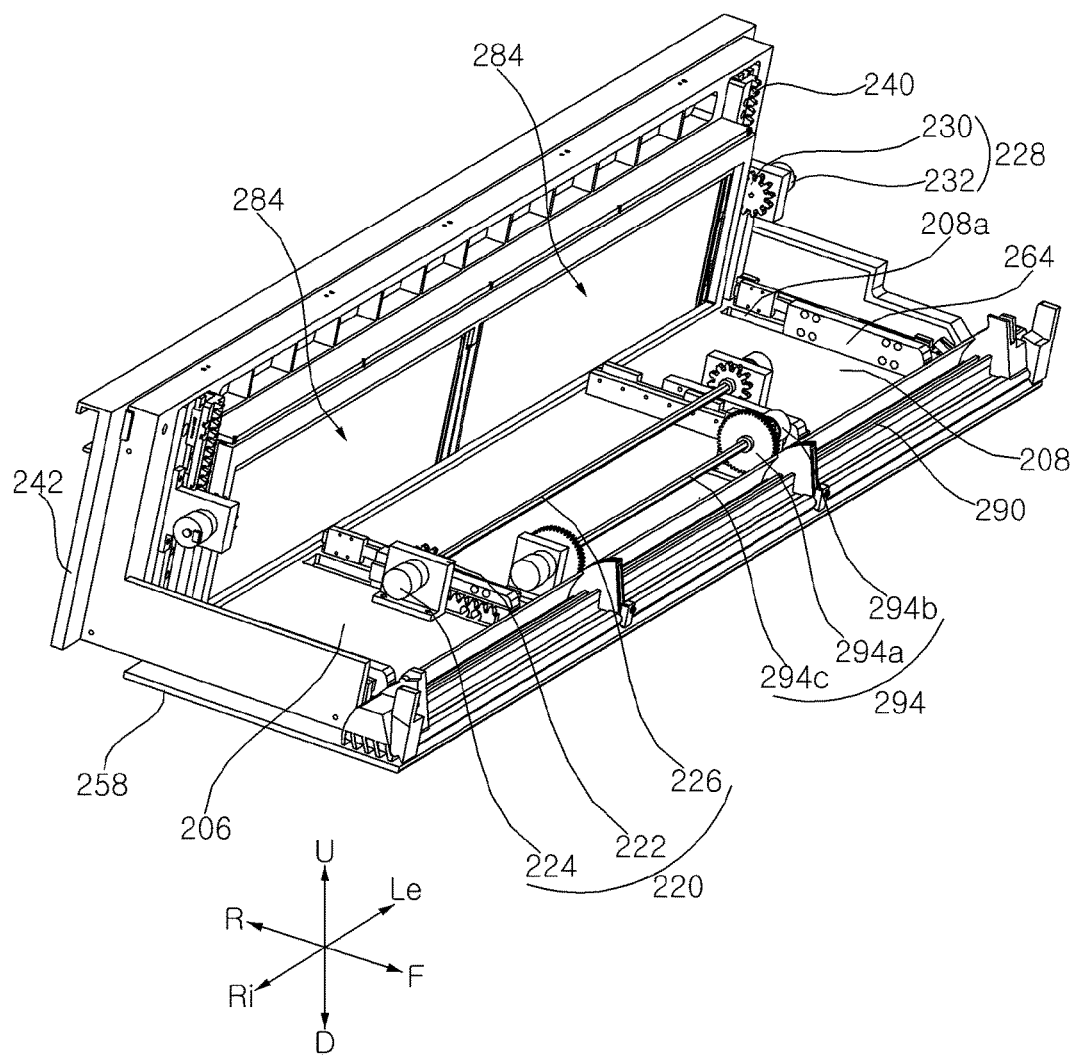
FIG. 34A is a perspective view for explaining the arrangement of the second bottom cover, the filter-mount, and the filter device in the state in which the second bottom cover is located at a front position.
Figure 34B:
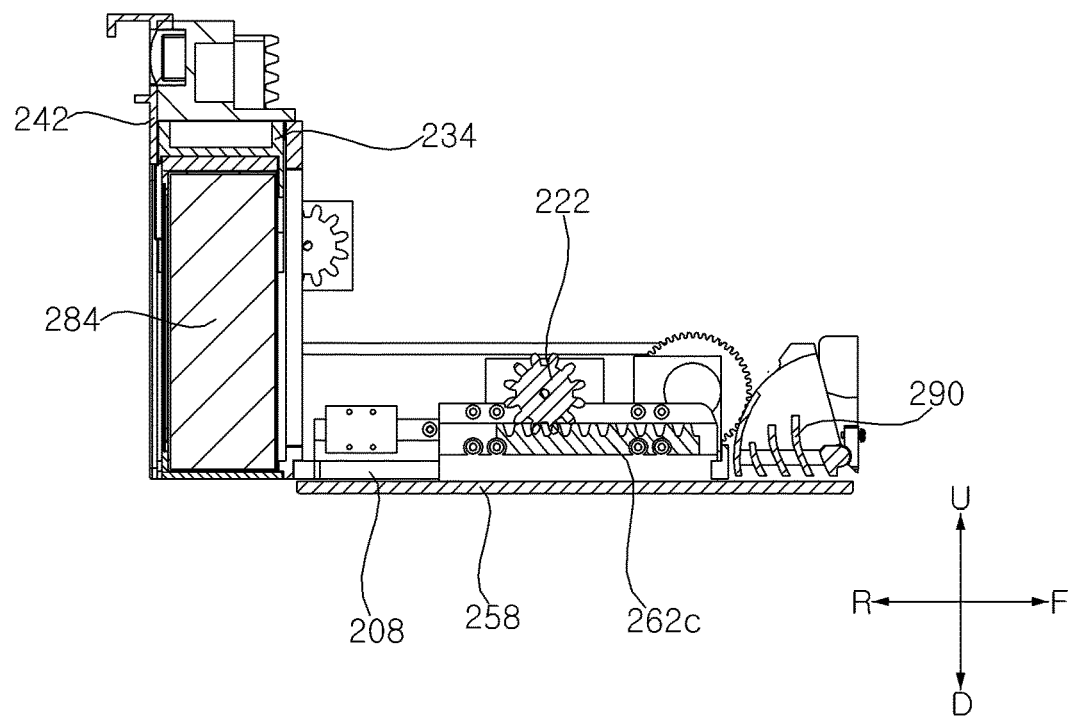
FIG. 34B is a cross-sectional view of the arrangement of FIG. 34A.

Referring to FIGS. 34A and 34B, the second bottom cover 258 may be moved forwards, and may be disposed below the second outlet 202b. The second bottom cover 258 may be moved forwards by the operation of the cover-drive device 220.

Referring to FIG. 34B, when the second bottom cover 258 is moved forwards, a region below the filter device 284 is opened. Referring to FIG. 34B, when the second bottom cover 258 is moved forwards, a lower side of the second outlet 202b is blocked. Accordingly, rotation of the second louver 270 is restricted.

Figure 35A:
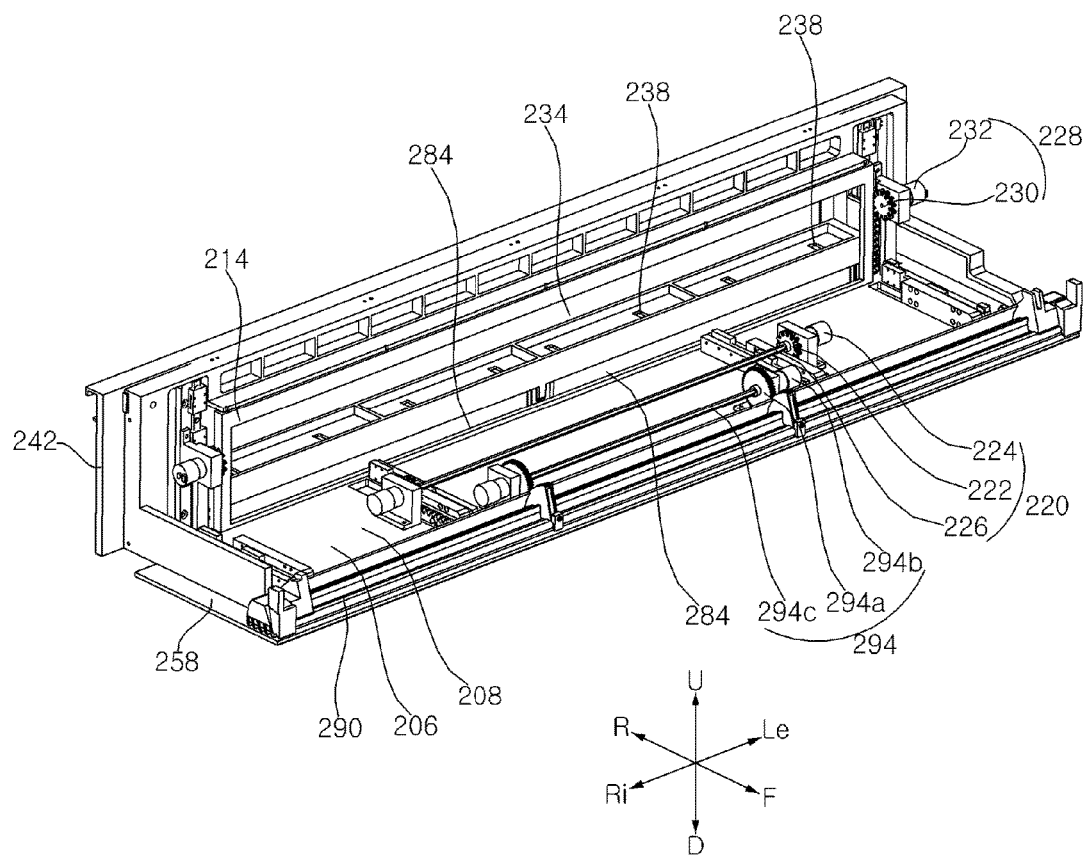
FIG. 35A is a perspective view for explaining the arrangement of the second bottom cover, the filter-mount, and the filter device in the state in which the second bottom cover is located at a front position and the filter-mount is moved downwards.
Figure 35B:
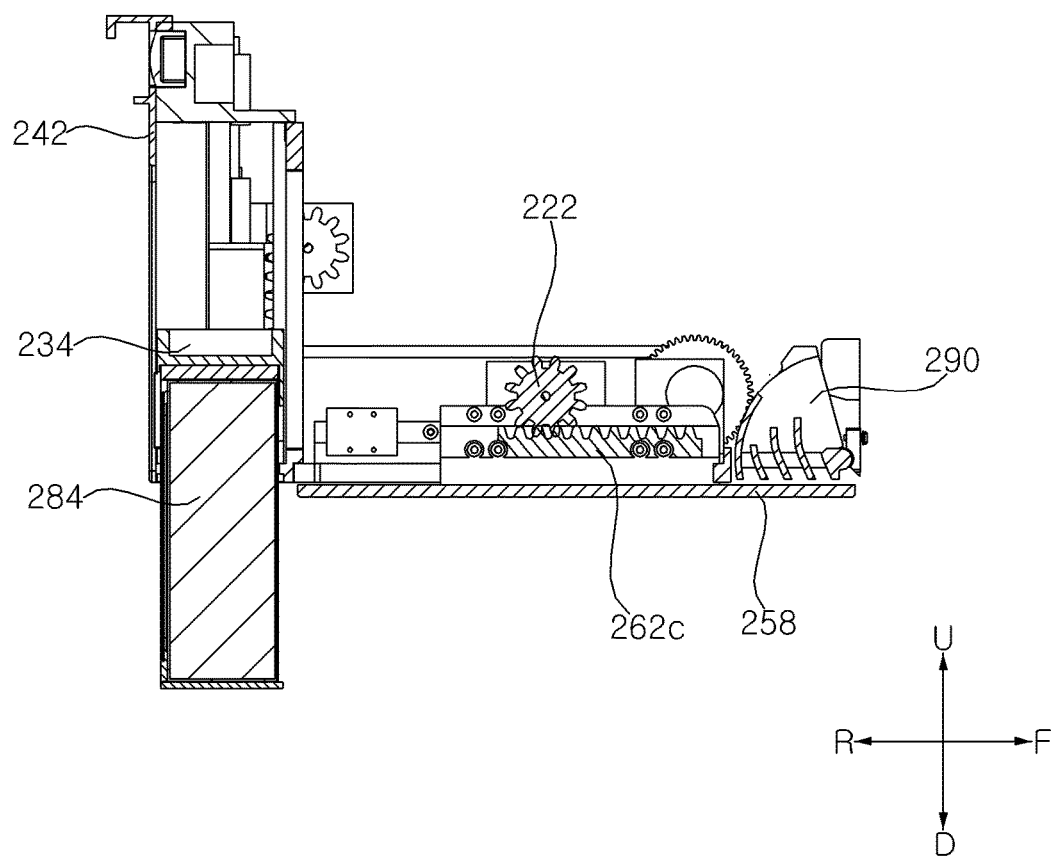
FIG. 35B is a cross-sectional view of the arrangement of FIG. 35A.
Figure 35C:
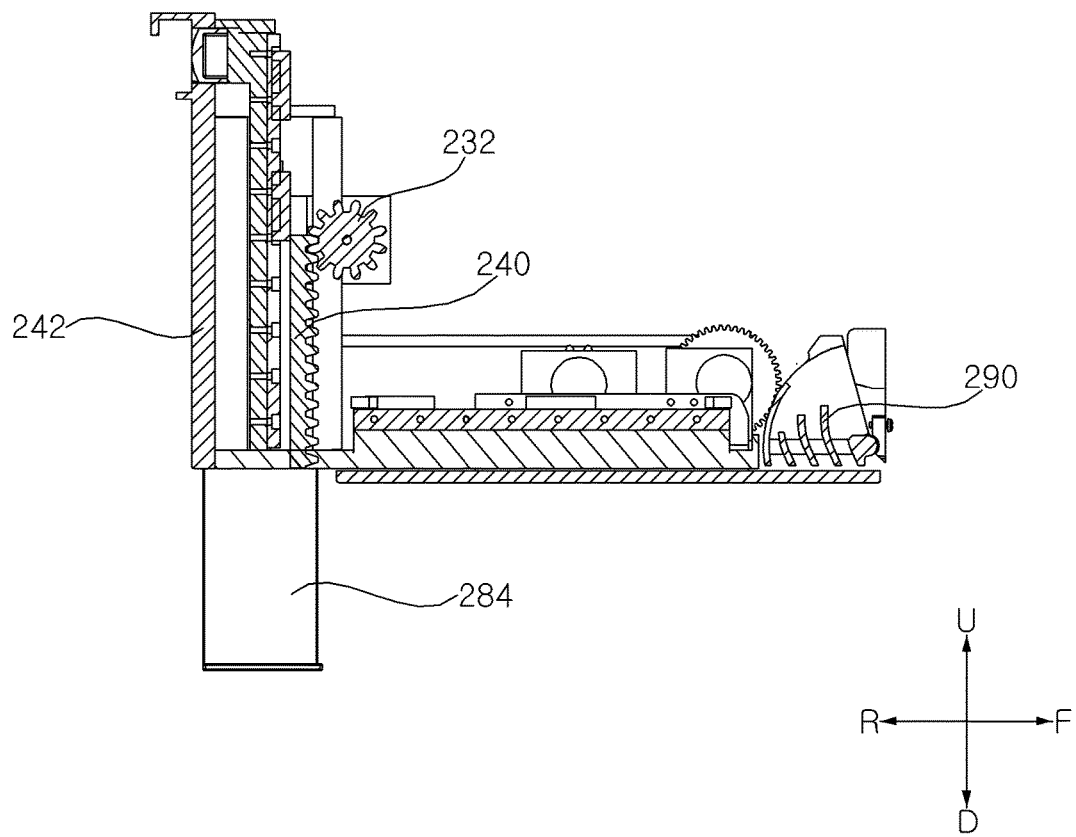
FIG. 35C is a cross-sectional view of the arrangement of FIG. 35A when viewed from a direction different from that of FIG. 35A.

Referring to FIGS. 35A to 35C, in a state in which the second bottom cover 258 is moved forwards, the filter device 284 and the filter-mount 234 may be moved downwards. The filter-mount 234 may be moved downwards by the filter-drive device 228.

The coupled state of the filter-mount 234 and the filter device 284 may be maintained by the first magnet 287 and the second magnet 238. Accordingly, when the filter-mount 234 is moved downwards, the filter device 284 is also moved downwards. When the filter device 284 is moved downwards by the filter-mount 234, a user may easily separate the filter device 284 from the filter-mount 234.

As is apparent from the above description, the air-conditioning system according to embodiments disclosed herein has one or more of the following advantages.

First, as an air-processing apparatus for discharging heat-exchanged air and an air-processing apparatus for discharging purified air are arranged in series in the lateral direction, it is possible to simultaneously perform air purification and temperature control in an indoor space.

Second, as the first air-processing apparatus and the second air-processing apparatus are arranged in the lateral direction and louvers disposed in outlets of the first and second air-processing apparatuses are individually operated, it is possible to individually adjust directions of air discharged therefrom in consideration of the temperature of air that is discharged, thereby promoting air circulation in an indoor space.

Third, the louver rotational shaft of the louver, which is disposed in the outlet of each of the first and second air-processing apparatuses, may be disposed at a relatively forward position, and the louver actuator may be disposed at a position spaced apart from the louver rotation shaft in the radial direction. As such, as the louver actuator is not disposed in the lateral direction of the louver, the louver is capable of being disposed over an entire area of the outlet in the lateral direction. Accordingly, it is possible to maximally utilize an area of the outlet through which air is discharged.

Fourth, it is possible to clean the pre-filter provided in each of the first and second air-processing apparatuses using a single filter cleaner, thereby maintaining cleanliness of the pre-filter.

Fifth, the filter device provided in the second air-processing apparatus may be moved in the upward-downward direction by the filter-drive device, which makes it easy for a user to reach the filter device.

Sixth, the inlet is formed in the case so as to be open in a direction perpendicular to the outlet, and thus, it possible to move only the filter disposed in the inlet in the downward direction. In addition, as the filter device disposed in the case may be moved downwards by the filter-mount, a user may be capable of easily separating the filter device disposed in the case, which is mounted on the ceiling.

Seventh, during operation of the fan, the bottom cover is located below the filter device, and thus, the filter device is stably supported. Accordingly, it is possible to reliably remove foreign substances from the air introduced into the air-processing apparatus.

Embodiments disclosed herein provide an air-conditioning system capable of simultaneously supplying heat-exchanged air and purified air to an indoor space. Embodiments disclosed herein further provide an air-conditioning system capable of rapidly circulating heat-exchanged air and purified air in an indoor space. Embodiments disclosed herein furthermore provide an air-conditioning system including an air-processing apparatus capable of maximally utilizing an area of an outlet.

Embodiments disclosed herein provide an air-conditioning system capable of maintaining cleanliness of pre-filters provided in a plurality of air-processing apparatuses. Embodiments disclosed herein also provide an air-conditioning system enabling a user to easily replace a filter mounted in a ceiling-mounted air-processing apparatus.

Embodiments disclosed herein provide an air-conditioning system including an air-processing apparatus in which a filter device is stably disposed in a case. Embodiments disclosed herein additionally provide an air-conditioning system including an air-processing apparatus in which a bottom cover, configured to be movable to cover a lower side of a filter device or a lower side of an outlet, is stably moved.

Advantages are not limited to the above-described advantages, and other advantages not mentioned herein may be readily understood by those skilled in the art from the description.

Embodiments disclosed herein provide an air-conditioning system that may include a first air-processing apparatus, which includes a first outlet formed to be open toward the floor and a first inlet formed to be open in a direction inclined relative to the direction in which the first outlet is open and is configured to cause air introduced into the first inlet to exchange heat with a refrigerant and to deliver the heat-exchanged air to the first outlet, and a second air-processing apparatus, which includes a second outlet formed to be open in a direction parallel to the first outlet and a second inlet formed to be open in a direction parallel to the first inlet and is configured to purify air introduced into the second inlet and to deliver the purified air to the second outlet. Accordingly, it is possible to simultaneously perform temperature control and air purification in an indoor space. Also, the first outlet and the second outlet may extend in a lateral or leftward-rightward direction, and the first air-processing apparatus and the second air-processing apparatus may be arranged in the lateral or leftward-rightward direction. Accordingly, it is possible to perform temperature control and air purification for a specific region in an indoor space.

The second outlet may be disposed in the direction in which the first outlet extends. Accordingly, a region in which temperature control is performed and a region in which air purification is performed are adjacent to each other, and thus, air conditioning and air purification may be simultaneously realized for the same region.

The first air-processing apparatus may further include a first louver configured to adjust a direction of air that is discharged through the first outlet. The second air-processing apparatus may further include a second louver configured to adjust a direction of air that is discharged through the second outlet. The first louver and the second louver may be individually operated. Accordingly, it is possible to individually adjust the directions of air discharged from the first and second outlets in consideration of the temperature of air that is discharged.

Each of the first louver and the second louver may include a louver rotational shaft disposed at a front side of a corresponding one of the first outlet and the second outlet and a plurality of vanes arranged in the radial direction based on the louver rotational shaft. Accordingly, it is possible to discharge air in a downward direction or a forward direction from the first outlet and the second outlet.

The first air-processing apparatus may further include a first louver actuator configured to drive the first louver, and the second air-processing apparatus may further include a second louver actuator configured to drive the second louver. Each of the first louver actuator and the second louver actuator may be connected to a corresponding one of the first louver and the second louver at a position spaced apart from the louver rotational shaft in the radial direction. That is, as the louver actuator is not disposed at either of the two side ends of the vane, the louver may be disposed over an entire area of the outlet in the lateral direction. Accordingly, it is possible to maximally utilize the area of the outlet.

The first air-processing apparatus may further include a first pre-filter disposed in the first inlet to remove foreign substances from the air flowing to the first inlet, and the second air-processing apparatus may further include a second pre-filter disposed in the second inlet to remove foreign substances from the air flowing to the second inlet. The air-conditioning system may further include a filter cleaner configured to move over the first air-processing apparatus and the second air-processing apparatus to remove foreign substances from the first pre-filter and the second pre-filter. Accordingly, it is possible to clean the pre-filter provided in each of the first air-processing apparatus and the second air-processing apparatus using a single filter cleaner.

Each of the first air-processing apparatus and the second air-processing apparatus may further include a guide rail configured to guide movement of the filter cleaner. Accordingly, the filter cleaner may move along the first air-processing apparatus and the second air-processing apparatus.

The first inlet may be formed in a portion of the surface of the first air-processing apparatus that is formed in a direction perpendicular to the floor, and the second inlet may be formed in a portion of the surface of the second air-processing apparatus that is formed in a direction perpendicular to the floor. The first pre-filter may be disposed so as to be withdrawn out of the first air-processing apparatus in the downward direction, and the second pre-filter may be disposed so as to be withdrawn out of the second air-processing apparatus in the downward direction. Accordingly, the first pre-filter and the second pre-filter may be withdrawn downwards out of the first air-processing apparatus and the second air-processing apparatus, respectively.

The guide rail may be disposed above the first inlet and the second inlet. Accordingly, the filter cleaner may not interfere with withdrawal of the pre-filter.

Each of the first air-processing apparatus and the second air-processing apparatus may further include a support rail configured to support the movement of the filter cleaner along the guide rail. Accordingly, it is possible to support the movement of the filter cleaner in the leftward-rightward direction.

The filter cleaner may include a sensor configured to confirm a position of the filter cleaner, and the guide rail may be provided with an object to be sensed with which the sensor reacts in order to confirm the position of the filter cleaner. A plurality of the object to be sensed may be provided, and the plurality of objects to be sensed may be arranged so as to be spaced apart from each other in a direction in which the guide rail extends. Accordingly, the filter cleaner may recognize the position of each of the first air-processing apparatus and the second air-processing apparatus.

The first air-processing apparatus may further include a heat exchanger configured to cause air introduced into the first inlet to exchange heat with the refrigerant, and the second air-processing apparatus may further include a filter device configured to remove foreign substances from the air introduced into the second inlet. Accordingly, the first air-processing apparatus may control the temperature in a specific space, and the second air-processing apparatus may purify air in the specific space. As a result, it is possible to simultaneously perform temperature control and air purification for the same space.

The first air-processing apparatus may further include a first case that forms an external appearance of the first air-processing apparatus, a first housing disposed inside of the first case to form a flow path through which air flows, and a first fan disposed inside of the first housing to cause air to flow. The first case may include a first upper cover configured to be fixed to a ceiling, a first lower cover disposed below the first upper cover, a first rear cover having formed therein the first inlet and that supports a first pre-filter mounted thereto, a first front cover disposed so as to be spaced forwards apart from the first rear cover, and a pair of first side covers disposed at respective ends of the first lower cover. A lower end of the first front cover may be disposed so as to be spaced apart from a front end of the first lower cover to form the first outlet. Accordingly, the first outlet may be formed in a direction perpendicular to the first inlet.

The first air-processing apparatus may further include a first louver rotatably disposed in the first case to adjust a direction of air that is discharged through the first outlet and a first louver actuator configured to change an orientation of the first louver. The first louver may be rotatably disposed at a lower side of the first front cover, and the first louver actuator may be disposed at an upper side of the first lower cover. Accordingly, the first louver actuator may be disposed at a position spaced apart from the louver rotational shaft in the radial direction.

The first housing may include a first upper housing disposed above the first fan and a first lower housing disposed below the first fan. The first upper housing and the first lower housing may form therein a discharge guide to guide movement of the air flowing from the first fan to the first outlet. Accordingly, the first housing may guide the air moved by the first fan to flow toward the outlet, in which the louver is disposed.

The first lower housing may include a drain pan disposed below the heater exchanger to collect therein condensation dropping from the heat exchanger and a drive device cover disposed in front of the drain pan and that protrudes upwards from the first lower cover to form a space in which to dispose the first louver actuator. Accordingly, condensation dropping from the heat exchanger may be collected, and a region in which the louver actuator is disposed may be covered.

The second air-processing apparatus may include a second case that forms an external appearance of the second air-processing apparatus, a second housing disposed inside of the second case to form a flow path through which air flows, and a second fan disposed inside of the second housing to cause air to flow. The second case may include a second upper cover configured to be fixed to a ceiling, a second lower cover disposed below the second upper cover, a second rear cover having formed therein the second inlet and that supports a filter device mounted thereto, a second front cover disposed so as to be spaced forwards apart from the second rear cover, a pair of second side covers disposed at respective ends of the second lower cover, and a second bottom cover disposed below the second lower cover and configured to be movable in a forward-rearward direction so as to be located below the filter device or below the second outlet. Accordingly, the second bottom cover may cover the second outlet or the lower side of the filter device by moving in the forward-rearward direction.

A filter-mounting part or portion may be disposed inside of the second rear cover in order to change the position of the filter device in the upward-downward direction, and a filter-drive device may be disposed on the second lower cover in order to move the filter device and the filter-mount in the upward-downward direction. Accordingly, the filter device may be moved downwards, and thus, a user may easily reach the filter device disposed in the ceiling-mounted air-processing apparatus.

A cover-drive device may be disposed on the second lower cover in order to move the second bottom cover in the forward-rearward direction. Accordingly, a position of the second bottom cover may be changed.

An air-processing apparatus may include a case having formed therein an outlet that is open in the downward direction and an inlet that is open in a direction perpendicular to the direction in which the outlet is open, a fan disposed inside of the case in order to cause air to flow from the inlet to the outlet, a filter device disposed in the inlet in order to remove foreign substances from the air introduced into the inlet, and a filter-mounting part or portion or filter mount moveably disposed in the case in order to change the position of the filter device in the upward-downward direction. Accordingly, it is possible to move the filter device mounted in the case, which is disposed on the ceiling, in the downward direction, thus enabling a user to easily reach the filter device.

Details of other advantages will be apparent from the description and the drawings.

Advantages are not limited to the above-described advantages, and other advantages not mentioned herein may be clearly understood by those skilled in the art from the accompanying claims.

Although embodiments have been described with reference to specific embodiments shown in the drawings, it will be apparent to those skilled in the art that the embodiments are not limited to those exemplary embodiments and may be embodied in many forms without departing from the scope, which is set forth in the following claims. These modifications should not be understood separately from the technical spirit or scope of the disclosure.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air-conditioning system, comprising:
    a first air-processing apparatus comprising a first outlet formed to be open toward a floor and a first inlet formed to be open in a direction inclined relative to a direction in which the first outlet is open, wherein the first air-processing apparatus is configured to cause air introduced into the first inlet to exchange heat with a refrigerant and to cause heat-exchanged air to flow to the first outlet, and wherein the first air-processing apparatus further comprises a first pre-filter disposed in the first inlet to remove foreign substances from air flowing into the first inlet;
    a second air-processing apparatus comprising a second outlet formed to be open in a direction parallel to the first outlet and a second inlet formed to be open in a direction parallel to the first inlet, wherein the second air-processing apparatus is configured to purify air introduced into the second inlet and to cause the purified air to flow to the second outlet, and wherein the second air-processing apparatus further comprises a second pre-filter disposed in the second inlet to remove foreign substances from air flowing into the second inlet;
    a filter cleaner configured to move over the first air-processing apparatus and the second air-processing apparatus to remove foreign substances from the first pre-filter and the second pre-filter;
    a guide rail configured to guide movement of the filter cleaner, wherein the guide rail extends continuously along a surface on which the first inlet of the first air-processing apparatus is formed and a surface on which the second inlet of the second air-processing apparatus is formed; and
    a support rail disposed on an upper side of the guide rail and configured to support movement of the filter cleaner along the guide rail, wherein the first air-processing apparatus is disposed in contact with one side of the second air-processing apparatus, wherein the first pre-filter and the second pre-filter are each located on a lower side of the guide rail, wherein a top roller positioned on an upper portion of the filter cleaner is positioned to contact an inner wall of the support rail, wherein the first outlet and the second outlet extend in a lateral direction, and wherein the first air-processing apparatus and the second air-processing apparatus are arranged in the lateral direction.

2. The air-conditioning system according to claim 1, wherein the second outlet is disposed in a direction in which the first outlet extends.

3. The air-conditioning system according to claim 1, wherein the first air-processing apparatus further comprises a first louver configured to adjust a direction of air that is discharged through the first outlet, wherein the second air-processing apparatus further comprises a second louver configured to adjust a direction of air that is discharged through the second outlet, and wherein the first louver and the second louver are individually operated.

4. The air-conditioning system according to claim 3, wherein each of the first louver and the second louver comprises:
    a louver rotational shaft disposed at a front side of a corresponding one of the first outlet and the second outlet; and a plurality of vanes arranged in a radial direction based on the louver rotational shaft.

5. The air-conditioning system according to claim 4, wherein the first air-processing apparatus further comprises a first louver actuator configured to drive the first louver, wherein the second air-processing apparatus further comprises a second louver actuator configured to drive the second louver, and wherein each of the first louver actuator and the second louver actuator is connected to a corresponding one of the first louver and the second louver at a position spaced apart from the louver rotational shaft in the radial direction.

6. The air-conditioning system according to claim 1, wherein the first inlet is formed in a portion of a surface of the first air-processing apparatus that extends in a direction perpendicular to the floor, wherein the second inlet is formed in a portion of a surface of the second air-processing apparatus that extends in a direction perpendicular to the floor, wherein the first pre-filter is configured to be withdrawn out of the first air-processing apparatus in a downward direction, and wherein the second pre-filter is configured to be withdrawn out of the second air-processing apparatus in the downward direction.

7. The air-conditioning system according to claim 6, wherein the guide rail is disposed above the first inlet and the second inlet.

8. The air-conditioning system according to claim 1, wherein the filter cleaner comprises a sensor configured to confirm a position of the filter cleaner, wherein the guide rail is provided with at least one object to be sensed with which the sensor reacts in order to confirm a position of the filter cleaner, and wherein the at least one object to be sensed comprises a plurality of objects to be sensed arranged so as to be spaced apart from each other in a direction in which the guide rail extends.

9. The air-conditioning system according to claim 1, wherein the first air-processing apparatus further comprises a heat exchanger configured to cause air introduced into the first inlet to exchange heat with the refrigerant, and wherein the second air-processing apparatus further comprises a filter device configured to remove foreign substances from air introduced into the second inlet.

10. The air-conditioning system according to claim 1, wherein the first air-processing apparatus further comprises:
a first case that forms an external appearance of the first air-processing apparatus;
a first housing disposed inside of the first case, the first housing forming a flow path through which air flows; and
a first fan disposed inside of the first housing, the first fan being configured to cause air to flow, wherein the first case comprises:
a first upper cover configured to be fixed to a ceiling;
a first lower cover disposed below the first upper cover;
a first rear cover having formed therein the first inlet, the first rear cover supporting a first pre-filter mounted thereto;
a first front cover disposed so as to be spaced forwards apart from the first rear cover; and
a pair of first side covers disposed at respective ends of the first lower cover, and wherein a lower end of the first front cover is disposed so as to be spaced apart from a front end of the first lower cover to form the first outlet.

11. The air-conditioning system according to claim 10, wherein the first air-processing apparatus further comprises:

a first louver rotatably disposed in the first case to adjust a direction of air that is discharged through the first outlet; and
a first louver actuator configured to change an orientation of the first louver, wherein the first louver is rotatably disposed at a lower side of the first front cover, and wherein the first louver actuator is disposed at an upper side of the first lower cover.

12. The air-conditioning system according to claim 11, wherein the first housing comprises:
a first upper housing disposed above the first fan; and
a first lower housing disposed below the first fan, and wherein the first upper housing and the first lower housing form therein a discharge guide to guide movement of air flowing from the first fan to the first outlet.

13. The air-conditioning system according to claim 12, wherein the first lower housing comprises:
a drain pan disposed below a heater exchanger to collect therein condensation dropping from the heat exchanger; and
a drive device cover disposed in front of the drain pan, the drive device cover protruding upwards from the first lower cover to form a space in which to dispose the first louver actuator.

14. The air-conditioning system according to claim 1, wherein the second air-processing apparatus comprises:
a second case that forms an external appearance of the second air-processing apparatus;
a second housing disposed inside of the second case, the second housing forming a flow path through which air flows; and
a second fan disposed inside of the second housing, the second fan being configured to cause air to flow, and wherein the second case comprises:
a second upper cover configured to be fixed to a ceiling;
a second lower cover disposed below the second upper cover;
a second rear cover having formed therein the second inlet, the second rear cover supporting a filter device mounted thereto;
a second front cover disposed so as to be spaced forwards apart from the second rear cover;
a pair of second side covers disposed at respective ends of the second lower cover; and
a second bottom cover disposed below the second lower cover, the second bottom cover being configured to be movable in a forward-rearward direction so as to be located below the filter device or below the second outlet.

15. The air-conditioning system according to claim 14, wherein the second air-processing apparatus further comprises:
a filter-mounting portion disposed inside of the second rear cover, the filter-mounting portion being configured to change a position of the filter device in an upward-downward direction; and
a filter-drive device disposed on the second lower cover, the filter-drive device being configured to move the filter device and the filter-mounting portion in the upward-downward direction.

16. The air-conditioning system according to claim 14, wherein the second air-processing apparatus further comprises:
a cover-drive device disposed on the second lower cover, the cover-drive device being configured to move the second bottom cover in the forward-rearward direction.

* * * * *